US012809194B2

(12) United States Patent
Telfer et al.

(10) Patent No.: US 12,809,194 B2
(45) Date of Patent: Nov. 24, 2026

(54) ELECTRO-OPTIC DEVICE HAVING ELECTROPHORETIC MEDIUM COMPRISING AN ORGANIC ELECTROACTIVE COMPOUND

(71) Applicant: E INK CORPORATION, Billerica, MA (US)

(72) Inventors: Stephen J. Telfer, Arlington, MA (US); Karl Raymond Amundson, Cambridge, MA (US); Clayton Arroco, Billerica, MA (US); Ana L. Lattes, Newton, MA (US); Kosta Ladavac, Cambridge, MA (US)

(73) Assignee: E Ink Corporation, Billerica, MA (US)

( * ) Notice: Subject to any disclaimer, the term of this patent is extended or adjusted under 35 U.S.C. 154(b) by 119 days.

(21) Appl. No.: 18/814,650

(22) Filed: Aug. 26, 2024

(65) Prior Publication Data

US 2025/0076688 A1 Mar. 6, 2025

Related U.S. Application Data

(60) Provisional application No. 63/535,471, filed on Aug. 30, 2023.

(51) Int. Cl.

*G02F 1/00* (2006.01)
*G02F 1/167* (2019.01)

(Continued)

(52) U.S. Cl.

CPC ............ *G02F 1/0018* (2013.01); *G02F 1/167* (2013.01); *G02F 1/1681* (2019.01); *G02F 1/1685* (2019.01); *G02F 2202/021* (2013.01)

(58) Field of Classification Search

CPC ...... G02F 1/0018; G02F 1/167; G02F 1/1681; G02F 1/1685; G02F 2202/021; G02F 1/16757

See application file for complete search history.

(56) References Cited

U.S. PATENT DOCUMENTS

| | | | |
|---|---|---|---|
| 4,418,346 | A | 11/1983 | Batchelder |
| 5,760,761 | A | 6/1998 | Sheridon |

(Continued)

FOREIGN PATENT DOCUMENTS

| | | | |
|---|---|---|---|
| WO | 1999067678 | A2 | 12/1999 |
| WO | 2000005704 | A1 | 2/2000 |
| WO | 2000038000 | A1 | 6/2000 |

OTHER PUBLICATIONS

European Patent Office, "International Search Report and Written Opinion", PCT/US2024/043799, Nov. 14, 2024.

(Continued)

*Primary Examiner* — Christina Y. Leung
(74) *Attorney, Agent, or Firm* — Ioannis Constantinides

(57) ABSTRACT

An electro-optic device is disclosed that comprises an electrophoretic medium including electrically charged pigment particles, a charge control agent, an organic electroactive compound, and a non-polar liquid. The electrophoretic medium is included in a plurality of microcells. The composition of the electrophoretic medium enables the reduction of remnant voltage of the electro-optic device and the degradation of the electrodes and other components of the device even after operation using DC-imbalance waveform.

19 Claims, 10 Drawing Sheets

(51) Int. Cl.
*G02F 1/1681* (2019.01)
*G02F 1/1685* (2019.01)

(56) References Cited

U.S. PATENT DOCUMENTS

| | | | |
|---|---|---|---|
| 5,777,782 | A | 7/1998 | Sheridon |
| 5,808,783 | A | 9/1998 | Crowley |
| 5,872,552 | A | 2/1999 | Gordon, II et al. |
| 6,054,071 | A | 4/2000 | Mikkelsen, Jr. |
| 6,055,091 | A | 4/2000 | Sheridon et al. |
| 6,097,531 | A | 8/2000 | Sheridon |
| 6,124,851 | A | 9/2000 | Jacobson |
| 6,128,124 | A | 10/2000 | Silverman |
| 6,130,773 | A | 10/2000 | Jacobson et al. |
| 6,130,774 | A | 10/2000 | Albert et al. |
| 6,137,467 | A | 10/2000 | Sheridon et al. |
| 6,144,361 | A | 11/2000 | Gordon, II et al. |
| 6,147,791 | A | 11/2000 | Sheridon |
| 6,172,798 | B1 | 1/2001 | Albert et al. |
| 6,177,921 | B1 | 1/2001 | Comiskey et al. |
| 6,184,856 | B1 | 2/2001 | Gordon, II et al. |
| 6,225,971 | B1 | 5/2001 | Gordon, II et al. |
| 6,232,950 | B1 | 5/2001 | Albert et al. |
| 6,241,921 | B1 | 6/2001 | Jacobson et al. |
| 6,252,564 | B1 | 6/2001 | Albert et al. |
| 6,271,823 | B1 | 8/2001 | Gordon, II et al. |
| 6,301,038 | B1 | 10/2001 | Fitzmaurice et al. |
| 6,312,304 | B1 | 11/2001 | Duthaler et al. |
| 6,312,971 | B1 | 11/2001 | Amundson et al. |
| 6,376,828 | B1 | 4/2002 | Comiskey |
| 6,392,786 | B1 | 5/2002 | Albert |
| 6,413,790 | B1 | 7/2002 | Duthaler et al. |
| 6,422,687 | B1 | 7/2002 | Jacobson |
| 6,445,374 | B2 | 9/2002 | Albert et al. |
| 6,480,182 | B2 | 11/2002 | Turner et al. |
| 6,498,114 | B1 | 12/2002 | Amundson et al. |
| 6,506,438 | B2 | 1/2003 | Duthaler et al. |
| 6,518,949 | B2 | 2/2003 | Drzaic |
| 6,521,489 | B2 | 2/2003 | Duthaler et al. |
| 6,535,197 | B1 | 3/2003 | Comiskey et al. |
| 6,545,291 | B1 | 4/2003 | Amundson et al. |
| 6,639,578 | B1 | 10/2003 | Comiskey et al. |
| 6,657,772 | B2 | 12/2003 | Loxley |
| 6,664,944 | B1 | 12/2003 | Albert et al. |
| D485,294 | S | 1/2004 | Albert |
| 6,672,921 | B1 | 1/2004 | Liang et al. |
| 6,680,725 | B1 | 1/2004 | Jacobson |
| 6,683,333 | B2 | 1/2004 | Kazlas et al. |
| 6,724,519 | B1 | 4/2004 | Comiskey et al. |
| 6,750,473 | B2 | 6/2004 | Amundson et al. |
| 6,788,449 | B2 | 9/2004 | Liang et al. |
| 6,816,147 | B2 | 11/2004 | Albert |
| 6,819,471 | B2 | 11/2004 | Amundson et al. |
| 6,825,068 | B2 | 11/2004 | Denis et al. |
| 6,831,769 | B2 | 12/2004 | Holman et al. |
| 6,842,167 | B2 | 1/2005 | Albert et al. |
| 6,842,279 | B2 | 1/2005 | Amundson |
| 6,842,657 | B1 | 1/2005 | Drzaic et al. |
| 6,865,010 | B2 | 3/2005 | Duthaler et al. |
| 6,866,760 | B2 | 3/2005 | Paolini, Jr. et al. |
| 6,870,657 | B1 | 3/2005 | Fitzmaurice et al. |
| 6,922,276 | B2 | 7/2005 | Zhang et al. |
| 6,950,220 | B2 | 9/2005 | Abramson et al. |
| 6,967,640 | B2 | 11/2005 | Albert et al. |
| 6,980,196 | B1 | 12/2005 | Turner et al. |
| 6,982,178 | B2 | 1/2006 | LeCain et al. |
| 7,002,728 | B2 | 2/2006 | Pullen et al. |
| 7,012,600 | B2 | 3/2006 | Zehner et al. |
| 7,012,735 | B2 | 3/2006 | Honeyman |
| 7,030,412 | B1 | 4/2006 | Drzaic et al. |
| 7,075,502 | B1 | 7/2006 | Drzaic et al. |
| 7,075,703 | B2 | 7/2006 | O'Neil et al. |
| 7,106,296 | B1 | 9/2006 | Jacobson |
| 7,110,163 | B2 | 9/2006 | Webber et al. |
| 7,116,318 | B2 | 10/2006 | Amundson et al. |
| 7,119,772 | B2 | 10/2006 | Amundson et al. |
| 7,148,128 | B2 | 12/2006 | Jacobson |
| 7,167,155 | B1 | 1/2007 | Albert et al. |
| 7,170,670 | B2 | 1/2007 | Webber |
| 7,173,752 | B2 | 2/2007 | Doshi et al. |
| 7,176,880 | B2 | 2/2007 | Amundson et al. |
| 7,190,008 | B2 | 3/2007 | Amundson et al. |
| 7,206,119 | B2 | 4/2007 | Honeyman et al. |
| 7,223,672 | B2 | 5/2007 | Kazlas et al. |
| 7,230,751 | B2 | 6/2007 | Whitesides et al. |
| 7,236,291 | B2 | 6/2007 | Kaga et al. |
| 7,256,766 | B2 | 8/2007 | Albert et al. |
| 7,259,744 | B2 | 8/2007 | Arango et al. |
| 7,280,094 | B2 | 10/2007 | Albert |
| 7,312,784 | B2 | 12/2007 | Baucom et al. |
| 7,321,459 | B2 | 1/2008 | Masuda et al. |
| 7,327,511 | B2 | 2/2008 | Whitesides et al. |
| 7,339,715 | B2 | 3/2008 | Webber et al. |
| 7,349,148 | B2 | 3/2008 | Doshi et al. |
| 7,352,353 | B2 | 4/2008 | Albert et al. |
| 7,365,394 | B2 | 4/2008 | Denis et al. |
| 7,365,733 | B2 | 4/2008 | Duthaler et al. |
| 7,382,363 | B2 | 6/2008 | Albert et al. |
| 7,388,572 | B2 | 6/2008 | Duthaler et al. |
| 7,411,719 | B2 | 8/2008 | Paolini, Jr. et al. |
| 7,420,549 | B2 | 9/2008 | Jacobson et al. |
| 7,442,587 | B2 | 10/2008 | Amundson et al. |
| 7,453,445 | B2 | 11/2008 | Amundson |
| 7,492,497 | B2 | 2/2009 | Paolini, Jr. et al. |
| 7,535,624 | B2 | 5/2009 | Amundson et al. |
| 7,551,346 | B2 | 6/2009 | Fazel et al. |
| 7,554,712 | B2 | 6/2009 | Patry et al. |
| 7,561,324 | B2 | 7/2009 | Duthaler et al. |
| 7,564,614 | B2 | 7/2009 | Chen et al. |
| 7,583,427 | B2 | 9/2009 | Danner et al. |
| 7,598,173 | B2 | 10/2009 | Ritenour et al. |
| 7,605,799 | B2 | 10/2009 | Amundson et al. |
| 7,636,191 | B2 | 12/2009 | Duthaler et al. |
| 7,649,674 | B2 | 1/2010 | Danner et al. |
| 7,667,886 | B2 | 2/2010 | Danner et al. |
| 7,672,040 | B2 | 3/2010 | Sohn et al. |
| 7,679,814 | B2 | 3/2010 | Paolini, Jr. et al. |
| 7,688,497 | B2 | 3/2010 | Danner et al. |
| 7,733,335 | B2 | 6/2010 | Zehner et al. |
| 7,785,988 | B2 | 8/2010 | Amundson et al. |
| 7,839,564 | B2 | 11/2010 | Whitesides et al. |
| 7,843,626 | B2 | 11/2010 | Amundson et al. |
| 7,859,637 | B2 | 12/2010 | Amundson et al. |
| 7,893,435 | B2 | 2/2011 | Kazlas et al. |
| 7,898,717 | B2 | 3/2011 | Patry et al. |
| 7,957,053 | B2 | 6/2011 | Honeyman et al. |
| 7,986,450 | B2 | 7/2011 | Cao et al. |
| 8,009,344 | B2 | 8/2011 | Danner et al. |
| 8,009,348 | B2 | 8/2011 | Zehner et al. |
| 8,027,081 | B2 | 9/2011 | Danner et al. |
| 8,049,947 | B2 | 11/2011 | Danner et al. |
| 8,077,141 | B2 | 12/2011 | Duthaler et al. |
| 8,089,453 | B2 | 1/2012 | Comiskey et al. |
| 8,208,193 | B2 | 6/2012 | Patry et al. |
| 8,319,759 | B2 | 11/2012 | Jacobson et al. |
| 8,373,211 | B2 | 2/2013 | Amundson et al. |
| 8,389,381 | B2 | 3/2013 | Amundson et al. |
| 8,498,042 | B2 | 7/2013 | Danner et al. |
| 8,610,988 | B2 | 12/2013 | Zehner et al. |
| 8,728,266 | B2 | 5/2014 | Danner et al. |
| 8,754,859 | B2 | 6/2014 | Gates et al. |
| 8,830,560 | B2 | 9/2014 | Danner et al. |
| 8,891,155 | B2 | 11/2014 | Danner et al. |
| 9,152,003 | B2 | 10/2015 | Danner et al. |
| 9,152,004 | B2 | 10/2015 | Paolini, Jr. et al. |
| 9,310,661 | B2 | 4/2016 | Wu et al. |
| 9,620,066 | B2 | 4/2017 | Bishop |
| 9,697,778 | B2 | 7/2017 | Telfer et al. |
| 9,726,957 | B2 | 8/2017 | Telfer et al. |
| 10,372,008 | B2 | 8/2019 | Telfer et al. |

(56) References Cited

U.S. PATENT DOCUMENTS

| | | | |
|---|---|---|---|
| 10,475,396 | B2 | 11/2019 | Sim et al. |
| 10,520,786 | B2 | 12/2019 | Telfer et al. |
| 10,585,325 | B2 | 3/2020 | Shao et al. |
| 10,678,111 | B2 | 6/2020 | Telfer et al. |
| 11,513,414 | B2 | 11/2022 | Telfer et al. |
| 2002/0060321 | A1 | 5/2002 | Kazlas et al. |
| 2004/0105036 | A1 | 6/2004 | Danner et al. |
| 2005/0122306 | A1 | 6/2005 | Wilcox et al. |
| 2005/0122563 | A1 | 6/2005 | Honeyman et al. |
| 2007/0052757 | A1 | 3/2007 | Jacobson |
| 2009/0122389 | A1 | 5/2009 | Whitesides et al. |
| 2009/0315044 | A1 | 12/2009 | Amundson et al. |
| 2011/0140744 | A1 | 6/2011 | Kazlas et al. |
| 2011/0187683 | A1 | 8/2011 | Wilcox et al. |
| 2011/0292319 | A1 | 12/2011 | Cole |
| 2017/0299938 | A1* | 10/2017 | Telfer ...................... G02F 1/155 |
| 2017/0351155 | A1* | 12/2017 | Paolini, Jr. .......... G02F 1/16757 |
| 2023/0213790 | A1 | 7/2023 | Yezek et al. |

OTHER PUBLICATIONS

European Patent Office, "Extended European Search Report", EP. Appl. No. 25195971.4, Oct. 6, 2025.

O'Regan, B. et al., "A Low Cost, High-efficiency Solar Cell Based on Dye-sensitized colloidal TiO2 Films", Nature, vol. 353, pp. 737-740 (Oct. 24, 1991).

Wood, D., "An Electrochromic Renaissance?" Information Display, 18(3), 24 (Mar. 2002).

Bach, Udo. et al., "Nanomaterials-Based Electrochromics for Paper-Quality Displays", Adv. Mater, vol. 14, No. 11, pp. 845-848, (Jun. 5, 2002).

Hayes, R.A. et al., "Video-Speed Electronic Paper Based on Electrowetting", Nature, vol. 425, No. 25, pp. 383-385 (Sep. 2003).

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

* cited by examiner

Color Gamut of Device Comprising Electrophoretic Medium with Organic Electroactive Material

ELECTRO-OPTIC DEVICE HAVING ELECTROPHORETIC MEDIUM COMPRISING AN ORGANIC ELECTROACTIVE COMPOUND

RELATED APPLICATIONS

This application claims priority to U.S. Provisional Patent Application No. 63/535,471 filed on Aug. 30, 2023, which is incorporated by reference in its entirety, along with all other patents and patent applications disclosed herein.

BACKGROUND OF THE INVENTION

This invention relates to an electro-optic device comprising an electrophoretic medium including electrically charged pigment particles, an organic electroactive compound, and a non-polar liquid. The electrophoretic medium is included in a plurality of microcells. The composition of the electrophoretic medium enables the reduction of remnant voltage of the electro-optic device even after operation using DC-imbalance waveform.

The terms "bistable" and "bistability" are used herein in their conventional meaning in the art to refer to displays comprising display elements having first and second display forms differing in at least one optical property, and such that after any given element has been driven, by means of an addressing pulse of finite duration, to assume either its first or second display form, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

Some electro-optic media are solid in the sense that the materials have solid external surfaces, although the media may, and often do, have internal liquid filled or gas filled spaces. Displays using solid electro-optic media may hereinafter for convenience be referred to as "solid electrophoretic displays".

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of electrically charged pigment particles move through a liquid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically mobile particles in a liquid, and a capsule wall surrounding the internal phase. Typically, the capsules are themselves held within a polymeric binder to form a coherent layer positioned between two electrodes. The technologies described in the these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Films and sub-assemblies containing electro-optic materials; see for example U.S. Pat. Nos. 6,982,178 and 7,839,564;

(d) Backplanes, adhesive layers and other auxiliary layers and methods used in displays; see for example U.S. Pat. Nos. D485,294; 6,124,851; 6,130,773; 6,177,921; 6,232,950; 6,252,564; 6,312,304; 6,312,971; 6,376,828; 6,392,786; 6,413,790; 6,422,687; 6,445,374; 6,480,182; 6,498,114; 6,506,438; 6,518,949; 6,521,489; 6,535,197; 6,545,291; 6,639,578; 6,657,772; 6,664,944; 6,680,725; 6,683,333; 6,724,519; 6,750,473; 6,816,147; 6,819,471; 6,825,068; 6,831,769; 6,842,167; 6,842,279; 6,842,657; 6,865,010; 6,967,640; 6,980,196; 7,012,735; 7,030,412; 7,075,703; 7,106,296; 7,110,163; 7,116,318; 7,148,128; 7,167,155; 7,173,752; 7,176,880; 7,190,008; 7,206,119; 7,223,672; 7,230,751; 7,256,766; 7,259,744; 7,280,094; 7,327,511; 7,349,148; 7,352,353; 7,365,394; 7,365,733; 7,382,363; 7,388,572; 7,442,587; 7,492,497; 7,535,624; 7,551,346; 7,554,712; 7,583,427; 7,598,173; 7,605,799; 7,636,191; 7,649,674; 7,667,886; 7,672,040; 7,688,497; 7,733,335; 7,785,988; 7,843,626; 7,859,637; 7,893,435; 7,898,717; 7,957,053; 7,986,450; 8,009,344; 8,027,081; 8,049,947; 8,077,141; 8,089,453; 8,208,193; 8,373,211; 9,726,957; 10,520,786; 10,585,325; and 11,513,414; and U.S. Patent Applications Publication Nos. 2002/0060321; 2004/0105036; 2005/0122306; 2005/0122563; 2007/0052757; 2007/0097489; 2007/0109219; 2007/0211002; 2009/0122389; 2009/0315044; 2010/0265239; 2011/0026101; 2011/0140744; 2011/0187683; 2011/0187689; 2011/0286082; 2011/0286086; 2011/0292319; 2011/0292493; 2011/0292494; 2011/0297309; 2011/0310459; and 2012/0182599; and International Application Publication No. WO 00/38000; European Patents Nos. 1,099,207 B1 and 1,145,072 B1;

(e) Color formation and color adjustment; see for example U.S. Pat. No. 7,075,502 and U.S. Patent Application Publication No. 2007/0109219;

(f) Methods for driving displays; see for example U.S. Pat. Nos. 7,012,600; 7,119,772; 7,453,445; and 10,475,396;

(g) Applications of displays; see for example U.S. Pat. Nos. 7,312,784 and 8,009,348; and (h) Non-electrophoretic displays, as described in U.S. Pat. Nos. 6,241,921; 6,950,220; 7,420,549 and 8,319,759; and U.S. Patent Application Publication No. 2012/0293858.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic medium and a continuous phase of a polymeric material, and that the discrete droplets of electrophoretic medium within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the electrically charged pigment particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques. Thus, the resulting display can be flexible. Further, because the display medium can be printed using a variety of methods, the display itself can be made inexpensively.

An electro-optic display normally comprises a layer of electro-optic material and at least two other layers disposed on opposed sides of the electro-optic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode, and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive. Similar manufacturing techniques can be used with other types of electro-optic displays. For example, a microcell electrophoretic medium or a rotating bichromal member medium may be laminated to a backplane in substantially the same manner as an encapsulated electrophoretic medium.

As discussed in the aforementioned U.S. Pat. No. 6,982,178, (see column 3, lines 63 to column 5, line 46) many of the components used in solid electro-optic displays, and the methods used to manufacture such displays, are derived from technology used in liquid crystal displays (LCD's), which are of course also electro-optic displays, though using a liquid rather than a solid medium. For example, solid electro-optic displays may make use of an active matrix backplane comprising an array of transistors or diodes and a corresponding array of pixel electrodes, and a "continuous" front electrode (in the sense of an electrode which extends over multiple pixels and typically the whole display) on a transparent substrate, these components being essentially the same as in LCD's. However, the methods used for assembling LCD's cannot be used with solid electro-optic displays. LCD's are normally assembled by forming the backplane and front electrode on separate glass substrates, then adhesively securing these components together leaving a small aperture between them, placing the resultant assembly under vacuum, and immersing the assembly in a bath of the liquid crystal, so that the liquid crystal flows through the aperture between the backplane and the front electrode. Finally, with the liquid crystal in place, the aperture is sealed to provide the final display.

This LCD assembly process cannot readily be transferred to solid electro-optic displays. Because the electro-optic material is solid, it must be present between the backplane and the front electrode before these two integers are secured to each other. Furthermore, in contrast to a liquid crystal material, which is simply placed between the front electrode and the backplane without being attached to either, a solid electro-optic medium normally needs to be secured to both; in most cases the solid electro-optic medium is formed on the front electrode, since this is generally easier than forming the medium on the circuitry-containing backplane, and the front electrode/electro-optic medium combination is then laminated to the backplane, typically by covering the entire surface of the electro-optic medium with an adhesive and laminating under heat, pressure and possibly vacuum. Accordingly, most prior art methods for final lamination of solid electrophoretic displays are essentially batch methods in which (typically) the electro-optic medium, a lamination adhesive and a backplane are brought together immediately prior to final assembly, and it is desirable to provide methods better adapted for mass production.

The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light transmissive electrically conductive layer; a layer of a solid electro-optic medium in electrical contact with the electrically conductive layer; an adhesive layer; and a release sheet. Typically, the light transmissive electrically conductive layer will be carried on a light transmissive substrate, which is preferably flexible, in the sense that the substrate can be manually wrapped around a drum (say) 10 inches (254 mm) in diameter without permanent deformation. The term "light transmissive" is used in this patent and herein to mean that the layer thus designated transmits sufficient light to enable an observer, looking through that layer, to observe the change in display states of the electro-optic medium, which will normally be viewed through the electrically conductive layer and adjacent substrate (if present); in cases where the electro-optic medium displays a change in reflectivity at non-visible wavelengths, the term "light transmissive" should of course be interpreted to refer to transmission of the relevant non-visible wavelengths. The substrate will typically be a polymeric film, and will normally have a thickness in the range of about 1 to about 25 mil (25 to 634 μm), preferably about 2 to about 10 mil (51 to 254 μm). The electrically conductive layer is conveniently a thin metal or metal oxide layer of, for example, aluminum or ITO. The electrically conductive layer may comprise a conductive polymer. Poly(ethylene terephthalate) (PET) films coated with aluminum or ITO are available commercially, for example as "aluminized Mylar" ("Mylar" is a Registered Trademark) from E.I. du Pont de Nemours & Company, Wilmington DE, and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically conductive layer to the backplane. This process is well adapted to mass production since the front plane laminate may be mass produced, typically using roll-to-roll coating techniques, and then cut into pieces of any size needed for use with specific backplanes.

U.S. Pat. No. 7,561,324 describes a so-called "double release sheet" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a back-plane to form the final display, although the order of these two laminations could be reversed if desired.

U.S. Pat. No. 7,839,564 describes a so-called "inverted front plane laminate", which is a variant of the front plane laminate described in the aforementioned U.S. Pat. No. 6,982,178. This inverted front plane laminate comprises, in order, at least one of a light transmissive protective layer and a light transmissive electrically conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin, layer of adhesive may or may not be present between the electro-optic layer and a backplane. Such electro-optic displays can combine good resolution with good low temperature performance.

In a high resolution display, each individual pixel must be addressable without interference from the addressing of adjacent pixels (whether or not the electro-optic medium used is bistable). One way to achieve this objective is to provide an array of non-linear elements, such as transistors or diodes, wherein at least one non-linear element is associated with each pixel, to produce an active matrix display, as mentioned above. An addressing (pixel) electrode, which addresses one pixel, is connected to an appropriate voltage source through its associated non-linear element. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; the assignment of sources to rows and gates to columns is conventional and could be reversed if desired. The row electrodes are connected to a row driver, which essentially ensures that at any given moment only one row is selected, i.e., that there is applied to the selected row electrode a voltage such as to ensure that all the transistors in the selected row are conductive, while there is applied to all other rows a voltage such as to ensure that all the transistors in these non-selected rows remain non-conductive. The column electrodes are connected to column drivers, which place upon the various column electrodes voltages selected to drive the pixels in the selected row to their desired optical states. The aforementioned voltages are relative to a common front electrode, which is conventionally provided on the opposed side of the electro-optic medium from the non-linear array and extends across the whole display. After a pre-selected interval known as the "line address time" the selected row is deselected, the next row is selected, and the voltages on the column drivers are changed so that the next line of the display is written. This process is repeated so that the entire display is written in a row-by-row manner.

In the discussion below, the term "waveform" will be used to denote the entire voltage against time curve used to effect the transition of a pixel from one specific initial gray level to a specific final gray level. Typically such a waveform will comprise a plurality of waveform elements; where these elements are essentially rectangular (i.e., where a given element comprises application of a constant voltage for a period of time); the elements may be called "pulses" or "drive pulses". The term "drive scheme" denotes a set of waveforms sufficient to effect all possible transitions between gray levels for a specific display. A display may make use of more than one drive scheme; for example, U.S. Pat. No. 7,012,600 teaches that a drive scheme may need to be modified depending upon parameters such as the temperature of the display or the time for which it has been in operation during its lifetime, and thus a display may be provided with a plurality of different drive schemes to be used at differing temperature etc. A set of drive schemes used in this manner may be referred to as "a set of related drive schemes."

Prior art front electrodes for use with the electrophoretic and similar electro-optic displays typically comprise a very thin (about 0.1 μm) layer of a ceramic, such as indium tin oxide or a similar mixed metal oxide (see the aforementioned U.S. Pat. No. 6,982,178). This thin layer is normally formed by sputtering the ceramic on to a polymer film, typically poly(ethylene terephthalate). Prior art rear (pixel) electrodes may be formed in a similar manner, or may be formed from thin metal films; the front electrode must of course be light transmissive to enable the electro-optic layer to be seen, whereas with a reflective electro-optic layer, the rear electrodes can be opaque.

Although ceramic front electrodes have been in large scale commercial use for many years, they still suffer from a number of mechanical, optical and electrical problems. The tensions and temperatures used during lamination steps in the manufacture of the display may cause the ceramic to crack and form discontinuities in conductivity, leading to poor or inconsistent switching of the display. These cracks are also areas of high water vapor transmission, which may cause local damage to a humidity sensitive electro-optic medium (many of the aforementioned types of electro-optic media are sensitive to humidity). In color display using color filter arrays (CFA's), it is desirable to reduce parallax problems by bringing the CFA as close as possible to the electro-optic layer using a thin polymeric film, reducing the thickness of the PET substrate on which the ITO is coated. As the PET substrate is made thinner the cracking issues associated with the ITO are accentuated due to the higher thermal shrinkage of the thinner base.

As discussed in detail in the aforementioned U.S. Pat. No. 7,119,772, it has been found desirable for at least some types of electro-optic display that the drive scheme at each pixel location be DC balanced, in the sense that, for any series of transitions beginning and ending at the same gray level, the algebraic sum of the impulses applied during the series of transitions be bounded. It has been found that accurately DC-balanced waveforms (i.e., those in which the integral of current against time for any particular pixel of the display is held to zero over an extended period of operation of the display) are required to preserve image stability, maintain symmetrical switching characteristics, and provide the maximum useful working lifetime in certain displays of the prior art.

It is generally preferred that all individual waveforms within a drive scheme be DC balanced, but in practice this has been difficult to achieve. Thus, typical drive schemes have usually been a mixture of DC balanced and DC imbalanced waveforms, even though the drive scheme as a whole has been DC balanced.

As discussed in the aforementioned U.S. Pat. No. 7,119, 772, the extent to which DC-imbalanced driving affects an electrophoretic or other electro-optic display (presumably by polarization of certain display components, as discussed in more detail below) may be ascertained by measuring the open circuit potential, hereinafter for convenience called the "remnant voltage", of a particular region, such as a pixel, of the display. When the remnant voltage of a pixel is zero, it is taken to be DC balanced. If its remnant voltage is positive, it is taken to be DC unbalanced in the positive direction. If its remnant voltage is negative, it is taken to be DC unbalanced in the negative direction. Non-zero remnant voltages have been found to correlate with difficulties in accurate gray level placement.

The degradation in display performance caused by development of remnant voltage is generally reversible, either by storing the display without further switching or by switching appropriately to rebalance the DC impulses. In cases where a prior art electrophoretic display is driven with extreme degrees of DC-imbalance, however, it is possible that the electrodes may be irreversibly degraded, presumably by electrochemical reactions that consume the electrode materials.

Although DC-balanced driving waveforms effectively protect against development of remnant voltages and electrode degradation, there are problems associated with their use. Extra time must be allocated in order to provide balancing impulses, sometimes resulting in update times that are two to three times longer than would be possible with a DC-imbalanced drive. In some electrophoretic compositions, the time required for an optical transition from black to white is different from that required from white to black. In a DC-balanced waveform, the longer of the two switching times must be used for both transitions. In addition, distracting optical transitions may be visible to the user of the display during DC-balanced updates.

As described for example in U.S. Pat. Nos. 6,724,519 and 7,564,614, corrosion inhibitors may be incorporated into electro-optic displays to prevent damage to electrodes from DC imbalances during driving of the displays. U.S. Pat. Nos. 9,726,957, 10,520,786, and 11,513,414 disclosed an electrophoretic display having an electro-optic material comprising an encapsulated electrophoretic media and a polymer layer between the electro-optic material layer and an electrode, wherein the polymer layer comprises a redox compound. The redox material mitigates the degradation of the display components from DC-imbalances. The present invention provides a more effective alternative method of preventing damage by including an organic electroactive compound in the electrophoretic medium. The present invention also provides an effective method of reducing the remnant voltage of the electro-optic device. In the electro-optic device of the present invention, the electrophoretic medium is in direct contact with a first electrode and at least one pixel electrode of the device. The organic electroactive compound is present in an oxidized form and a reduced form in the electrophoretic medium. Its reduced form is oxidizable at one of the electrodes and its oxidized form is reducible at one of the electrodes, preventing damage of the electrodes and other components of the device.

SUMMARY OF THE INVENTION

Accordingly, this invention provides an electro-optic device comprising a first electrode layer comprising a light transmissive electrode, a second electrode layer comprising a plurality of pixel electrodes, and a microcell layer, the microcell layer being disposed between the first electrode layer and the second electrode layer. The microcell layer comprises a plurality of microcells, each microcell of the plurality of microcells comprising an electrophoretic medium, the electrophoretic medium being in contact with the light transmissive electrode of the first electrode layer and at least one of the plurality of pixel electrodes of the second electrode layer. The electrophoretic medium includes (a) electrically charged pigment particles, (b) a non-polar liquid, (c) a charge control agent, and (d) an organic electroactive compound. The organic electroactive compound is present in the electrophoretic medium in an oxidized form and a reduced form. The oxidized form of the organic electroactive compound is electrochemically reducible at the surface of one of the first and second electrode layers. The reduced form of the organic electroactive compound is electrochemically oxidizable at the surface of one of the first and second electrode layers. The oxidized form and the reduced form of the organic electroactive compound (i) are soluble in the non-polar liquid of the electrophoretic medium, or (ii) are included in reverse micelle structures that are present in the electrophoretic medium. The oxidized form of the organic electroactive compound may have a reduction potential that is not greater than 1.0 V relative to a standard hydrogen electrode.

The molecular structure of the reduced form of the organic electroactive compound may be represented by Formulas I to IX. $R_1$ to $R_{39}$ may be hydrogen, substituted or unsubstituted alkyl or aryl groups, and substituents $R_1$ and $R_2$, taken together, and/or $R_3$ and $R_4$, and/or $R_5$ and $R_6$, and/or $R_6$ and $R_7$, and/or $R_7$ and $R_8$, $R_9$ and $R_{10}$, and/or $R_{11}$ and $R_{12}$, and/or $R_{14}$ and $R_{15}$, and/or $R_{15}$ and $R_{16}$, and/or $R_{16}$ and $R_{17}$, and/or $R_{19}$ and $R_{20}$, and/or $R_{21}$ and $R_{22}$, and/or $R_{25}$ and $R_{26}$, and/or $R_{26}$ and $R_{27}$, and/or $R_{27}$ and $R_{28}$, may form a ring; and at least one of $R_{31}$ and $R_{32}$ is an aryl group, at least one of $R_{33}$ and $R_{34}$ is an aryl group, and at least one of $R_{36}$ and $R_{37}$ is an aryl group.

Formula I

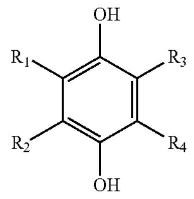

Formula II

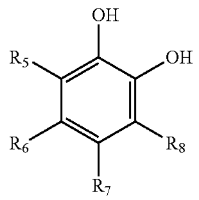

Formula III

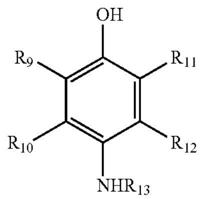

-continued

Formula IV

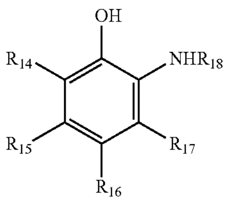

Formula V

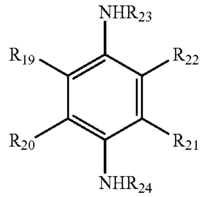

Formula VI

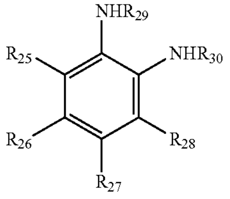

Formula VII

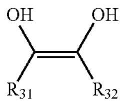

Formula VIII

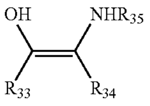

Formula IX

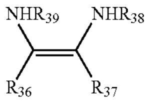

Groups $R_1$ to $R_{39}$ may be hydrogen, substituted or unsubstituted alkyl, alkenyl, or aryl groups. Substituents $R_1$ and $R_2$ (taken together), and/or $R_3$ and $R_4$, and/or $R_5$ and $R_6$, and/or $R_6$ and $R_7$, and/or $R_7$ and $R_8$, $R_9$ and $R_{10}$, and/or $R_{11}$ and $R_{12}$, and/or $R_{14}$ and $R_{15}$, and/or $R_{15}$ and $R_{16}$, and/or $R_{16}$ and $R_{17}$, and/or $R_{19}$ and $R_{20}$, and/or $R_{21}$ and $R_{22}$, and/or $R_{25}$ and $R_{26}$, and/or $R_{26}$ and $R_{27}$, and/or $R_{27}$ and $R_{28}$, may form a ring. At least one of $R_{31}$ and $R_{32}$ may be an aryl group, at least one of $R_{33}$ and $R_{34}$ is an aryl group, and at least one of $R_{36}$ and $R_{37}$ is an aryl group.

At least one of $R_1$ to $R_4$ of Formula I, at least one of $R_5$ to $R_8$ of Formula II, at least one of $R_9$ to $R_{13}$ of Formula III, at least one of $R_{14}$ to $R_{18}$ of formula IV, at least one of $R_{19}$ to $R_{24}$ of Formula V, at least one of $R_{25}$ to $R_{30}$ of Formula VI, at least one of $R_{31}$ and $R_{32}$ of Formula VII, at least one of $R_{33}$ to $R_{35}$ of Formula VIII, and at least one of $R_{36}$ to $R_{39}$ of Formula IX may be an alkyl or alkenyl group having at least 10 carbon atoms.

At least one of $R_9$ to $R_{12}$ of Formula III, at least one of $R_{14}$ to $R_{17}$ of formula IV, at least one of $R_{19}$ to $R_{22}$ of Formula V, at least one of $R_{25}$ to $R_{28}$ of Formula VI, at least one of $R_{33}$ and $R_{34}$ of Formula VIII, and at least one of $R_{36}$ and $R_{37}$ of Formula IX may be an alkyl or alkenyl group having at least 10 carbon atoms. The alkyl or alkenyl group may have from 10 to carbon atoms to 100 carbon atoms. The alkyl or alkenyl group comprises an isoprene dimer or oligomer may comprise from 1 to 20 isoprenyl units ($—CH2CH{=}C(CH_3)CH_2—$). The alkyl or alkenyl group may comprise an isoprene dimer or oligomer comprising from 1 to 13 isoprenyl units ($—CH2CH{=}C(CH_3)CH_2—$).

The molecular structure of the reduced form of the organic electroactive compound may be represented by Formula X. Groups $R_1$, $R_2$, and $R_3$ may be hydrogen, alkyl, alkenyl, or alkoxy groups, and n may be an integer from 2 to 20. Groups $R_1$ and $R_2$ may be both methoxy groups, and $R_3$ may be methyl group. Groups $R_1$ and $R_2$ may be both methyl groups, and $R_3$ may be hydrogen.

Formula X

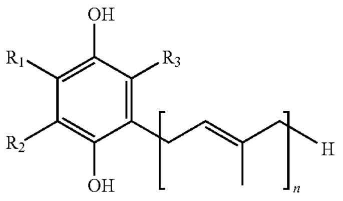

The reduced form of the organic electroactive compound may be ubiquinol-10.

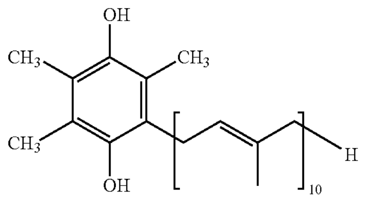

Ubiquinol-10

The reduced form of the organic electroactive compound may be represented by Formula XI.

Formula XI

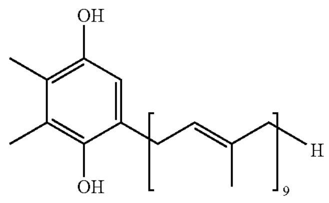

The molecular structure of the oxidized form of the organic electroactive compound may be represented by Formula XII. Groups $R_{40}$, $R_{41}$, $R_{42}$, $R_{43}$, and $R_{44}$ may be hydrogen, alkyl, alkenyl, or alkoxy groups, and m may be an integer from 2 to 20.

Formula XII

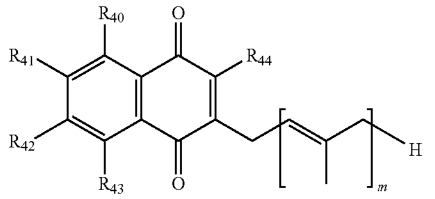

The molecular structure of the oxidized form of the organic electroactive compound may be represented by Formula XIII or Formula XIV. Groups $R_{45}$, $R_{46}$, $R_{47}$, $R_{48}$, $R_{49}$, $R_{50}$, $R_{51}$, and $R_{52}$ may be hydrogen, alkyl, alkenyl, or alkoxy groups, p may be an integer from 2 to 20, and q may be an integer from 2 to 20. Integer q may be selected from the group consisting of 3, 4, 7, and 9.

If the organic electroactive compound is represented by Formula XIV, groups $R_{48}$, $R_{49}$, $R_{50}$, and $R_{51}$ may all be hydrogens, and $R_{52}$ may be methyl.

Formula XIII

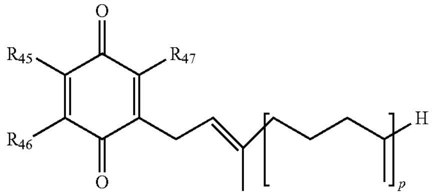

Formula XIV

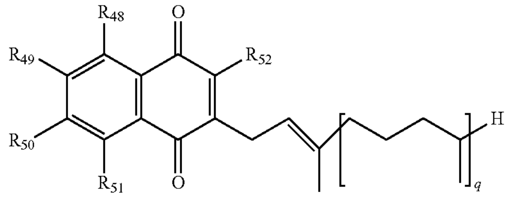

In another aspect, this invention provides a method of operating an electro-optic device, the method of operating comprising: (a) providing the electro-optic device; and (b) driving the electro-optic device using a DC-imbalanced waveform. The remnant voltage of the electro-optic device may be lower than the remnant voltage of a control electro-optic device, the control electro-optic device including a control electrophoretic medium comprising no organic electroactive compound. The electro-optic device comprises a first electrode layer comprising a light transmissive electrode, a second electrode layer comprising a plurality of pixel electrodes, and a microcell layer, the microcell layer being disposed between the first electrode layer and the second electrode layer. The microcell layer comprises a plurality of microcells, each microcell of the plurality of microcells comprising an electrophoretic medium, the electrophoretic medium being in contact with the light transmissive electrode of the first electrode layer and at least one of the plurality of pixel electrodes of the second electrode layer. The electrophoretic medium includes (a) electrically charged pigment particles, (b) a non-polar liquid, (c) a charge control agent, and (d) an organic electroactive compound. The organic electroactive compound is present in the electrophoretic medium in an oxidized form and a reduced form. The oxidized form of the organic electroactive compound is electrochemically reducible at the surface of one of the first and second electrode layers. The reduced form of the organic electroactive compound is electrochemically oxidizable at the surface of one of the first and second electrode layers. The oxidized form and the reduced form of the organic electroactive compound are soluble in the non-polar liquid of the electrophoretic medium or are included in reverse micelle structures that are present in the electrophoretic medium.

According to another aspect, this invention provides an electro-optic device comprising a first electrode layer comprising a light transmissive electrode, a second electrode layer comprising a plurality of pixel electrodes, and a microcell layer, the microcell layer being disposed between the first electrode layer and the second electrode layer. The microcell layer comprises a plurality of microcells, each microcell of the plurality of microcells comprising an electrophoretic medium, the electrophoretic medium being in contact with the light transmissive electrode of the first electrode layer and at least one of the plurality of pixel electrodes of the second electrode layer. The electrophoretic medium includes (a) electrically charged pigment particles, (b) a non-polar liquid, (c) a charge control agent, and (d) an organic electroactive compound. The organic electroactive compound is present in the electrophoretic medium in an oxidized form or a reduced form. The oxidized form of the organic electroactive compound is electrochemically reducible at the surface of one of the first and second electrode layers. The reduced form of the organic electroactive compound is electrochemically oxidizable at the surface of one of the first and second electrode layers. The oxidized form and the reduced form of the organic electroactive compound (i) are soluble in the non-polar liquid of the electrophoretic medium, or (ii) are included in reverse micelle structures that are present in the electrophoretic medium. The oxidized form of the organic electroactive compound may have a reduction potential that is not greater than 1.0 V relative to a standard hydrogen electrode.

DETAILED DESCRIPTION OF THE INVENTION

The term "oxidized form" referring to an organic electroactive compound is used herein to include the fully oxidized form of the organic electroactive compound and other molecules that are more oxidized than the fully reduced form of the organic electroactive compound. The term "reduced form" referring to an organic electroactive compound is used herein to include the fully reduced form of the organic electroactive compound and other compounds that are more reduced than the fully oxidized form of the organic electroactive compound.

The term "unsubstituted alkyl group" refers to branched and unbranched group containing one or more single C—C bonds, and not a double C—C bond or a triple C—C bond. The term "unsubstituted alkyl group" includes cyclic groups containing single C—C bonds and not a double C—C bond or a triple C—C bond or an aromatic group. The term "unsubstituted alkenyl group" refers to branched and unbranched groups containing one or more double C—C bonds. The term "unsubstituted aryl group" refers to a group containing an aromatic ring. The term "substituted alkyl group" refers to an alkyl group, in which one or more hydrogen is replaced by a substituent, the substituent not being an alkyl group. The substituent may be an alkenyl group, an aryl group, or a group that includes a heteroatom, the heteroatom being an atom of groups V-VII of the periodic table. The term "substituted alkenyl" refers to an alkenyl group, in which one or more hydrogen is replaced by a substituent, the substituent not being an alkenyl group or an alkyl group. The substituent may be an aryl group or a group that includes a heteroatom, the heteroatom being an atom of groups V-VII of the periodic table. The term "substituted aryl" refers to an aryl group, in which one or more hydrogen is replaced by a substituent. The substituent may be an alkyl group, an alkenyl group, an aryl group or a group that comprises a heteroatom, the heteroatom being an atom of groups V-VII of the periodic table. Non-limiting examples of heteroatom are nitrogen, phosphorus, oxygen, sulfur, selenium, fluorine, chlorine, bromine, and iodine. Non-limiting examples of groups that comprises a heteroatom are hydroxyl, amino, alkoxy, carboxy, thio, cyano, nitro, and others.

Figure 1:
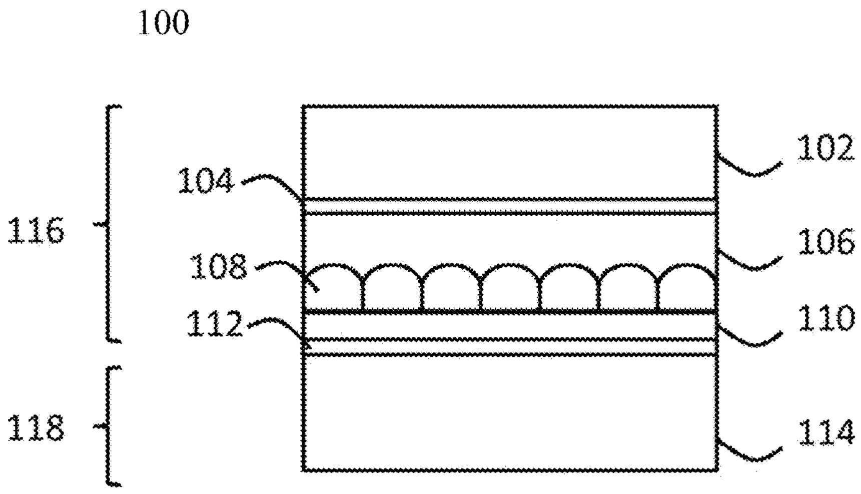
FIG. 1 Prior Art
FIG. 1 is a side view of an electro-optic display comprising electrophoretic medium encapsulated in microcapsules from prior art.

A typical electro-optic display may have an electro-optic material layer that comprise electrophoretic medium, which is encapsulated in microcapsules or microcells, as described in U.S. Pat. No. 6,982,178. FIG. 1 shows a side view of an example of the basic structure of a portion of an electro-optic display having microcapsules. Electro-optic display 100 comprises a front plane 116, a backplane 118, and an adhesive layer 110 that connects front plane 116 and backplane 118. Front plane 116 comprises a front substrate 102, a light transmissive electrically conductive layer 104 (also called in the literature as first electrode or top electrode or common electrode), optionally a polymeric layer 106, and an electro-optic material layer 108. Backplane 118 comprises a plurality of pixel electrodes 112 and a rear substrate 114. An adhesive layer 110 connects the electro-optic material layer 108 of front plane 116 with the backplane 118. Light transmissive electrically conductive layer 104 acts as the front electrode of the display. The electro-optic material layer 108 comprises a plurality of microcapsules. Each microcapsule has a microcapsule wall and includes electrophoretic medium having charge pigment particles in a non-polar liquid. Typically, the plurality of microcapsules are retained within a polymeric binder. A viewer can view the image of electrophoretic medium of electro-optic display 100 from the side of the front substrate of the display.

Figure 2:
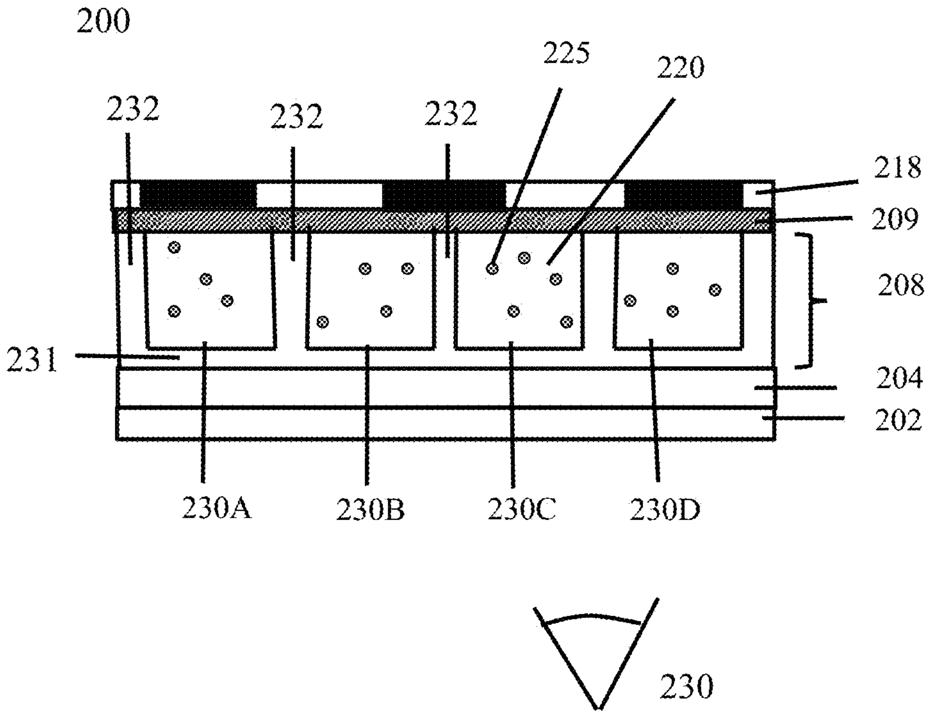
FIG. 2 Prior Art
FIG. 2 is a side view of an electro-optic display comprising electrophoretic medium encapsulated in microcells from prior art.

FIG. 2 is a side view of an example of the basic structure of a portion of an electro-optic display having microcells. Electro-optic display 200 has a viewing side 230 and comprises a front substrate 202, a light transmissive electrically conductive layer 204, an electro-optic material layer 208, a sealing layer 209, and a backplane 218, the backplane comprising a plurality of pixel electrodes. The electro-optic material layer 208 comprises a plurality of microcells 230A-D. Each microcell 230A-D of the electro-optic material layer 208 comprises electrophoretic medium 220. Electrophoretic medium 220 comprises electrically charged pigment particles 225 in a non-polar liquid. Each microcell 230A-D has a bottom layer 231, microcell walls 232, and an opening. Microcell walls 232 separate adjacent microcells from each other. Sealing layer 209 spans each opening of the microcells and seals electrophoretic medium 220 inside the microcells.

In the electro-optic display of FIG. 1, which comprises microcapsules, front substrate 102 is light transmissive. Front substrate 102 may be a plastic film, such as a sheet of poly(ethylene terephthalate) (PET) having thickness of from 25 to 200 μm. Although not shown in FIG. 1, front substrate 102 may further comprise one or more additional layers, for example, a protective layer to absorb ultraviolet radiation, barrier layers to prevent ingress of oxygen or moisture into the display, and anti-reflection coatings to improve the optical properties of the display. The same is true for the electro-optic display of FIG. 2, which comprises microcells. That is, in the electro-optic display of FIG. 2, which comprises microcells, front substrate 202 is light transmissive. Front substrate 202 may be a plastic film, such as a sheet of poly(ethylene terephthalate) (PET) having thickness of from 25 to 200 μm. Front substrate 202 may further comprise one or more additional layers, for example, a protective layer to absorb ultraviolet radiation, barrier layers to prevent ingress of oxygen or moisture into the display, and anti-reflection coatings to improve the optical properties of the display.

In the electro-optic displays of FIG. 1, which comprises microcapsules, the light transmissive electrically conductive layer 104 may be a thin continuous coating of electrically conductive material with minimal intrinsic absorption of electromagnetic radiation in the visible spectral range such as indium tin oxide (ITO), poly(3,4-ethylenedioxythiophene) poly(styrenesulfonate) (PEDOT:PSS), graphene or the like. The same is true for the electro-optic display of FIG. 2, which comprises microcells. That is, the light transmissive electrically conductive layer 204 may be a thin continuous coating of electrically conductive material with minimal intrinsic absorption of electromagnetic radiation in the visible spectral range such as indium tin oxide (ITO), poly(3,4-ethylenedioxythiophene) poly(styrenesulfonate) (PEDOT:PSS), graphene or the like.

The electrophoretic medium of electro-optic display 100 of FIG. 1 and the electrophoretic medium of electro-optic display 200 of FIG. 2 may comprise two types of electrically charged pigment particles. The electrophoretic medium of the displays may comprise three types, four types, five types, or more than five types of electrically charged pigment particles. Each type of electrically charged pigment particles may have a different color. Each type of electrically charged pigment particles may have a positive or negative charge. If the electrophoretic medium comprises two types of electrically charged pigment particles, i.e. a first and second type of electrically charged pigment particles, the first type of the electrically charged pigment particles may be white and negatively charged (or positively charged) and the second type of the electrically charged pigment particles may be black and positively charged (or negatively charged). Upon application of an electric field across the electro-optic material layer via the light transmissive electrically conductive layer and a pixel electrode of the backplane, the white particles of the electrophoretic medium move towards the positive electrode and the black particles move towards the negative electrode, so that an observer viewing the display from the viewing side (the side of front substrate), sees the portion of the display that corresponds to the pixel electrode either white or black, depending upon whether the light transmissive electrically conductive layer is positive or negative relative to the pixel electrode.

As described in U.S. Pat. No. 6,982,178, adhesive layer 110 of the electrophoretic medium of electro-optic display 100 is disposed between electro-optic material layer 108, which comprises encapsulated electrophoretic medium, and the plurality of pixel electrodes 112 of backplane 118 (see FIG. 1). The adhesive layer 110 enables the construction of an electro-optic display by combining two subassemblies, such as front plane 116 and backplane 118 of FIG. 1. Adhesive layer 110 may be formed by coating an adhesive composition on the surface of electro-optic material layer 108, connecting front plane 116 and backplane 118, and then curing the adhesive composition thermally or via UV curing. In the case of the microcell electro-optic display of FIG. 2, sealing layer 209 is disposed between the plurality of microcells, which include electrophoretic medium 220, and the pixel electrodes 212 of backplane 218.

Adhesive layer 110 of the microcapsule electro-optic display 100 of FIG. 1 and sealing layer 209 of the microcell electro-optic display 200 of FIG. 2 are in the electrical path separating the pixel electrodes of backplane from the light transmissive electrically conductive layer. Thus, the electrical properties of the adhesive layer of the microcapsule electro-optic display and the electrical properties of the sealing layer of the microcell electro-optic display are important for the operation of the display and they must be carefully tailored. For example, the sealing layer may comprise, in addition to a polymeric material, conductive filler particles to adjust its volume resistivity.

Polymeric layer 106 of microcapsule electro-optic display 100 of FIG. 1 may be a lamination adhesive layer with similar properties to those described above with reference to adhesive layer 110. However, because polymeric layer 106 is adjacent to the non-pixelated, light transmissive common electrode 104, its electrical conductivity may be higher than that of lamination adhesive layer 110, which is adjacent to the pixelated backplane electrodes 112 and cannot be so conductive as to lead to significant currents flowing from one backplane electrode to its neighbors when they are held at different potentials during switching of the display. When polymeric layer 106 is an adhesive layer, it may be used to affix electro-optic material layer 108 to electrode layer 104 during manufacture of the front plane as described in detail in the aforementioned U.S. Pat. No. 6,982,178.

Figure 3A:
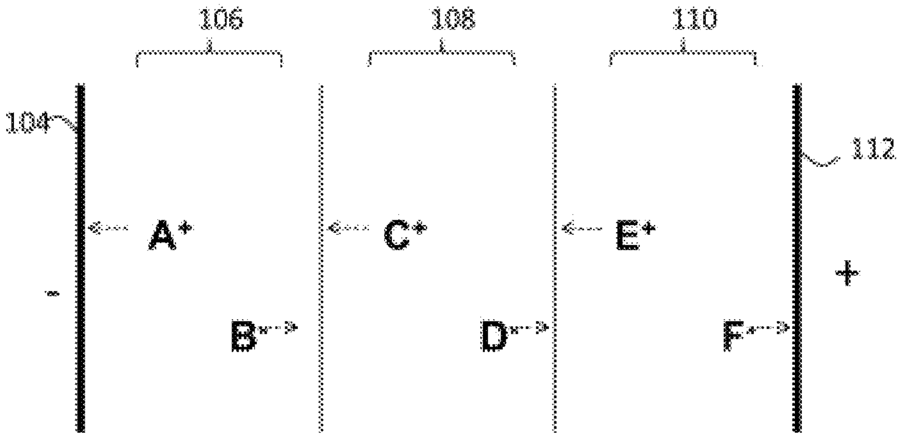
FIG. 3A Prior Art
FIG. 3A is a simplified schematic of the movements of charged species that are present in the electrophoretic medium and the adjacent layers of an electro-optic display in response to an electric field that may result in charge accumulation at the electrode interfaces and in the reduction of the image quality of the display. The figure is disclosed in the prior art.

FIG. 3A is reproduced from the prior art. Specifically, this figure was published as FIG. 2 of U.S. Pat. No. 9,726,957. It is a simplified illustration of the movements of charged species that are present in the electrophoretic medium of the electro-optic material layer and its adjacent layers of electro-optic display 100 of FIG. 1 in response to an electric field applied by means of electrodes 104 and 112. For convenience, only polymeric layer 106, electro-optic material layer 108 and adhesive layer 110 are shown, although, as will be clear to one of ordinary skill in the art, other layers are present in the display. Mobile charged species in each layer are shown generically as positively charged species A, C and E, and negatively charged species B, D and F. Species A and B in polymeric layer 106 could arise, for example, from an ionic dopant added to enhance the conductivity of polymeric layer 106 or could be present adventitiously in the materials used to form polymeric layer 106. For example, if water is present in polymeric layer 106, species A could correspond to a proton arising from the ionization of the water. Species A may comprise more than one mobile, cationic species. In this discussion, species Species A refers to any mobile, positively charged species in polymeric layer 106. Likewise, species E and F refer to positively charged and negatively charged mobile species in adhesive layer 110. Species C and D refer to mobile, charged entities in the electrophoretic medium of electro-optic material layer 108; such entities include charged pigment particles, whose motion changes the optical state of the display, and charged species, whose motion has no direct optical effect, such as micellar charges that are well known in the art.

Charged species may cross the boundaries between the various layers of the display. This is shown schematically in FIG. 3A, wherein positively charged species E is shown as crossing the boundary between adhesive layer 110 and electro-optic material layer 108. Furthermore, negatively charged species B is shown as crossing the boundary between polymeric layers 106 and electro-optic material layer 108. If charged entities are displaced within their respective layers and cannot cross the boundaries between layers, charge will accumulate at the impermeable boundary, being stored as if in an electrolytic capacitor. After the applied electric field is removed and electrodes 104 and 112 are grounded, discharge of the stored charge at boundaries within the display will occur, changing the electric field experienced by the electrophoretic medium of electro-optic material layer 108 and potentially changing the optical state of the display.

Even if mobile ionic charges can flow freely across the boundaries between the layers within the display (without accumulating at the internal boundaries), there is still the difficulty that ionic species cannot cross the boundaries between the interior layers of the display and the electrodes 104 and 112. The only likely mechanism for charge transfer across these boundaries is electron transfer, i.e., reduction/oxidation chemical processes. If electron transfer between electrodes 104 and 112 and the interior layers is blocked, ionic charges will inevitably build up at the boundaries between electrode 104 and layer 106 and between layer 110 and electrode 112. If the display is driven with a DC imbalanced drive scheme a substantial charge build-up at these locations may occur. Relaxation of the built-up charge when the electrodes are brought to a common potential may lead to a flow of charge carriers through the electro-optic material layer 108. This flow of charge carriers may lead to a change in the optical state of the display, which may be undesirable.

Figure 3B:
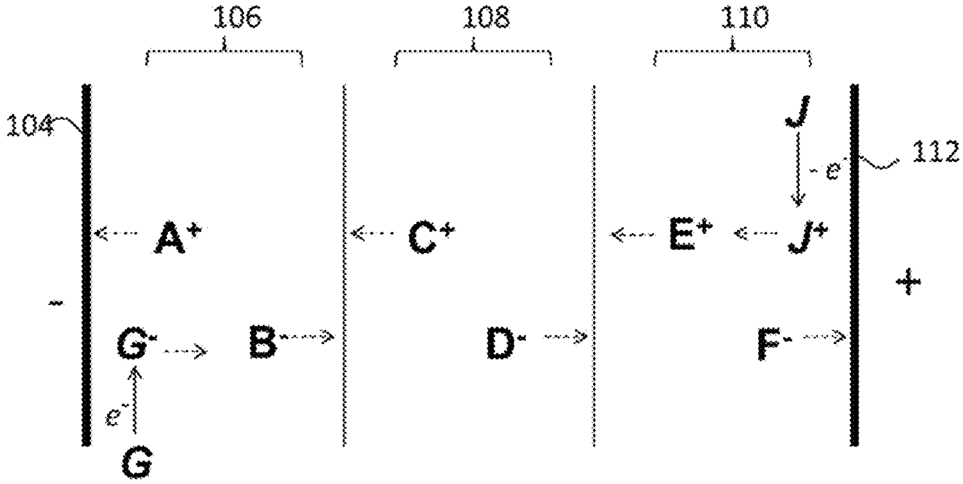
FIG. 3B Prior Art
FIG. 3B is a simplified schematic of the movements and transformations of important species that are present in the electrophoretic medium and the adjacent layers of an electro-optic display in response to an electric field. The figure is disclosed in the prior art, which is relevant to the mitigation of charge accumulation and remnant voltage at electrode interfaces.

The above-mentioned U.S. Pat. No. 9,726,957 disclosed a technology that mitigates the problem of charge accumulation by adding an electrochemically active compound into a layer of the electro-optic display that is adjacent to the electro-optic material layer. The electrochemically active compound is oxidizable or reducicble. The invention of U.S. Pat. No. 9,726,957 is schematically illustrated in FIG. 3B, which was published as FIG. 3 of the patent. As shown in FIG. 3B, charge accumulation at electrode interfaces is mitigated by electrochemical oxidation/reduction reactions involving electron transfer from the electrodes to materials that are included in polymeric layer 106 and adhesive layer 110 of the electro-optic display of FIG. 1. At the cathode, an electron is transferred to reduce a component in the adjacent layer (reduction of neutral species G to provide anion G− is illustrated), while at the anode an electron is transferred to the electrode resulting in oxidation of a component in the adjacent layer (electron transfer from neutral species J to produce cation J+ is shown). The injected charges are of the opposite sign to the charges displaced during initial polarization of the display, and thus the charge buildup at the electrode interfaces is mitigated. As indicated in FIG. 3B, when a potential is applied to electro-optic display 100 of FIG. 1, migration of ions towards the electrodes leads to accumulation of charge in thin diffuse layers near the electrodes, the thickness of these layers being of the order of the Debye screening length, as is well known in the electrochemical art. Within these diffuse layers, the gradients in electrical potential are very steep. After a certain time, the potential gradient becomes sufficient to cause electron transfer reactions. The ease of electron transfer is determined by, among other things, the redox potentials of the materials present in the vicinity of the electrodes and their concentrations.

As mentioned above, in the above-mentioned U.S. Pat. No. 9,726,957, the electrochemically active compound that is used to control charge injection at the electrode interface is incorporated into an external phase layer of the display, that is, in a layer different from the electro-optic material layer, which includes the electrophoretic medium. However, it was found that, in practice, only those components that are within a sufficiently short distance from effective electron transfer to or from the electrodes would be effectively oxidized or reduced. Thus, the components undergoing electron transfer at an electrode might be depleted faster than the time required to be replenished by diffusion onto the electrode surface, given that diffusion of typical electroactive compounds through polymers are too slow to sustain a practical electric current in the display. For this reason, the electro-optic device structure disclosed in U.S. Pat. No. 9,726,957 is not optimal to mitigate the problem of charge accumulation at the electrodes and the resulting remnant voltage.

The inventors of the present invention surprisingly found that a microcell elector-optic device having an electrophoretic medium in contact with the first electrode layer and at least one of a plurality of pixel electrodes, the electrophoretic material comprising an organic electroactive compound, provides an effective mitigation of remnant voltage following extended DC-imbalanced driving. In another example, an electrophoretic medium in contact with the first electrode layer and all of the pixel electrodes of the plurality of pixel electrodes. The electro-optic device of the present invention comprises (1) a first electrode layer comprising a light transmissive electrode, (2) a second electrode layer comprising a plurality of pixel electrodes, and (3) a microcell layer disposed between the first electrode layer and the second electrode layer. The microcell layer comprises a plurality of microcells, each microcell of the plurality of microcells comprising an electrophoretic medium, the electrophoretic medium being in contact with the light transmissive electrode of the first electrode layer and at least one of the plurality of pixel electrodes of the second electrode layer (or more than one, or all, the pixel electrodes of the second electrode layer). The electrophoretic medium includes (a) electrically charged pigment particles, (b) a non-polar liquid, (c) a charge control agent, and (d) an organic electroactive compound. The organic electroactive compound is present in the electrophoretic medium in an oxidized form and a reduced form. The oxidized form of the organic electroactive compound is electrochemically reducible at the surface of one of the light transmissive electrodes of the first electrode layer and a pixel electrode of second electrode layers. The reduced form of the organic electroactive compound is electrochemically oxidizable at the surface of one of the light transmissive electrodes of the first electrode layer and a pixel electrode of the second electrode layer. The oxidized form and the reduced form of the organic electroactive compound are soluble in the non-polar liquid of the electrophoretic medium. Alternatively, the oxidized form and the reduced form of the organic electroactive compound are included in reverse micelle structures that are present in the electrophoretic medium.

The content of the organic electroactive compound in the electrophoretic medium may be from 0.1 to 10 weight percent by weight of the electrophoretic medium. The content of the organic electroactive compound in the electrophoretic medium may be from 0.2 to 8 weight percent, 0.3 to 6 weight percent, from 0.4 to 5 weight percent, from 0.5 to 4 weight percent, from 0.6 to 3 weight percent, or from 0.7 to 2 weight percent by weight of the electrophoretic medium.

Reverse micelle structures in a non-polar liquid (first liquid) are droplets of a second liquid or droplets of a dispersion (particles in a third liquid) that are surrounded by amphiphilic molecules. The droplets form the core of the reverse micelle structures. Amphiphilic molecules are molecules having both a hydrophobic group (head) and a hydrophobic group (tail) in their molecular structure. Typically, the beads of the amphiphilic molecules are oriented towards the core of each reverse micelle structure and the tails are oriented towards the outside surface of the reverse micelle structure, as the tails are hydrophobic and more compatible with the non-polar liquid. The second liquid or the third liquid are less hydrophobic than the tail of the amphiphilic molecule and the non-polar fluid and more compatible with the head of the amphiphilic molecule. The non-polar liquid is called "continuous phase" of the reverse micelle structures/non-polar liquid mixture.

Figure 4:
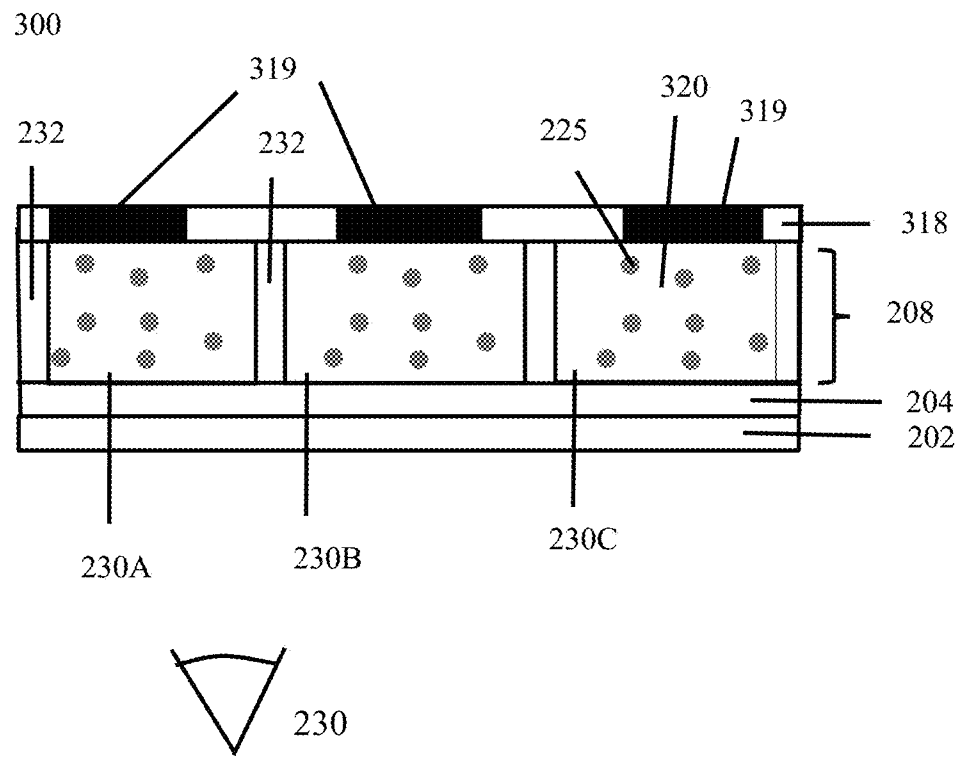
FIG. 4 is a side view of an example of an electro-optic device according to the present invention.

FIG. 4 is a side view of an example of an electro-optic device according to the present invention. The electro-optic device 300 comprises a front substrate 202, a first electrode layer 204 having a light transmissive electrode, an electro-optic material layer 208, and a second electrode layer 318. Electro-optic device 300 has a viewing side 230. The second electrode layer 318 comprises a plurality of pixel electrodes 319. The electro-optic material layer 208 comprises a plurality of microcells 230A-D. Each microcell 230A-D of the electro-optic material layer 208 comprises electrophoretic medium 320. Electrophoretic medium 320 comprises electrically charged pigment particles 225 in a non-polar liquid. Microcell walls 232 separate adjacent microcells from each other. In electro-optic device 300, the light transmissive electrode of the first electrode layer 204 and at least one of pixel electrodes 319 of the plurality of pixel electrodes of second electrode layer 318 are in contact with electrophoretic medium 320. More than one pixel electrode 319 of the plurality of pixel electrodes of the second electrode layer 318 may be in contact with the electrophoretic medium. All the pixel electrodes 319 of the plurality of pixel electrodes of the second electrode layer 318 may be in contact with the electrophoretic medium 320. The second electrode layer 318 is typically part of a backplane, the backplane comprising circuitry and a substrate. The fact that the electrophoretic medium is in contact with light transmissive electrode of the first electrode layer and with the pixel electrodes of the second electrode layer means that electro-optic device 300 may not comprise a sealing layer, which is present in commercially available microcell electro-optic displays that comprise electrophoretic media.

Front substrate 202 of electro-optic device 300 of FIG. 4 may be a plastic film, such as a sheet of poly(ethylene terephthalate) (PET) having thickness of from 25 to 200 μm. Front substrate 202 may further comprise one or more additional layers, for example, a protective layer to absorb ultraviolet radiation, barrier layers to prevent ingress of oxygen or moisture into the display, and anti-reflection coatings to improve the optical properties of the display.

The light transmissive electrode of first electrode layer 204 of electro-optic device 300 of FIG. 4 may be a thin continuous coating of electrically conductive material with minimal intrinsic absorption of electromagnetic radiation in the visible spectral range such as indium tin oxide (ITO), poly(3,4-ethylenedioxythiophene) poly(styrenesulfonate) (PEDOT:PSS), graphene or the like.

The electrophoretic medium of electro-optic display 300 of FIG. 4 may comprise two types of electrically charged pigment particles. The electrophoretic medium of the display may comprise three types, four types, five types, or more than five types of electrically charged pigment particles. Each type of electrically charged pigment particles may have a different color. Each type of electrically charged pigment particles may have a positive or negative charge. If the electrophoretic medium comprises two types of electrically charged particles, i.e. a first and second type of electrically charged pigment particles, the first type of pigment particles may be white and negatively charged (or positively charged) and the second type of electrically charged pigment particles may be black and positively charged (or negatively charged). Upon application of an electric field across the electro-optic material layer via the light transmissive electrode of the first electrode layer and a pixel electrode of the second electrode layer, the white particles of the electrophoretic medium move towards the positive electrode and the black particles move towards the negative electrode, so that an observer, who views the display from viewing side (the side of front substrate), sees the portion of the display that corresponds to the pixel electrode either white or black, depending upon whether the light transmissive electrode is positive or negative relative to the pixel electrode.

The electrophoretic medium of electro-optic display 300 of FIG. 4 may further comprise one or more charge control agents (CCA). The CCA may be a low molecular weight surfactant, polymeric agent, or blends of one or more components. The CCA is used to stabilize or otherwise modify the sign and/or magnitude of the charge on the electrically charged pigment particles. The CCA is typically a molecule comprising ionic or other polar functional groups (head groups). At least one of the positive or negative ionic head groups is preferably attached to a non-polar chain (tail group), which is typically a hydrocarbon chain. It is thought that the CCA forms reverse micelle structures in the electrophoretic medium.

During the operation of the electro-optic device, the organic electroactive compound may be present in the electrophoretic medium in an oxidized form and in a reduced form. The oxidized form of the organic electroactive compound is electrochemically reducible at the surface, or near the surface, of the light transmissive electrode of the first electrode layer or a pixel electrode of the second electrode layer. The reduced form of the organic electroactive compound is electrochemically oxidizable at the surface, or near the surface, of the light transmissive electrode of the first electrode layer or a pixel electrode of the second electrode layer. That is, the oxidized form is electrochemically reversibly reduced to the reduced form and the reduced form is electrochemically reversibly oxidized to the oxidized form. The conversion of the oxidized form to the reduced form and from the reduced form to the oxidized form via redox reactions. Thus, organic electrochemically active compounds may also be called redox materials.

Although organic electroactive compounds that are capable of at least partial reversible redox reactions are preferred to those undergoing irreversible reactions, the ability to undergo fully reversible redox reactions is not an absolute requirement of the invention. The presence of the reduced form or the oxidized form of the organic electroactive compound at sufficient concentration mitigates premature degradation of the device and reduces the remnant voltage for a period of time.

Figure 5:
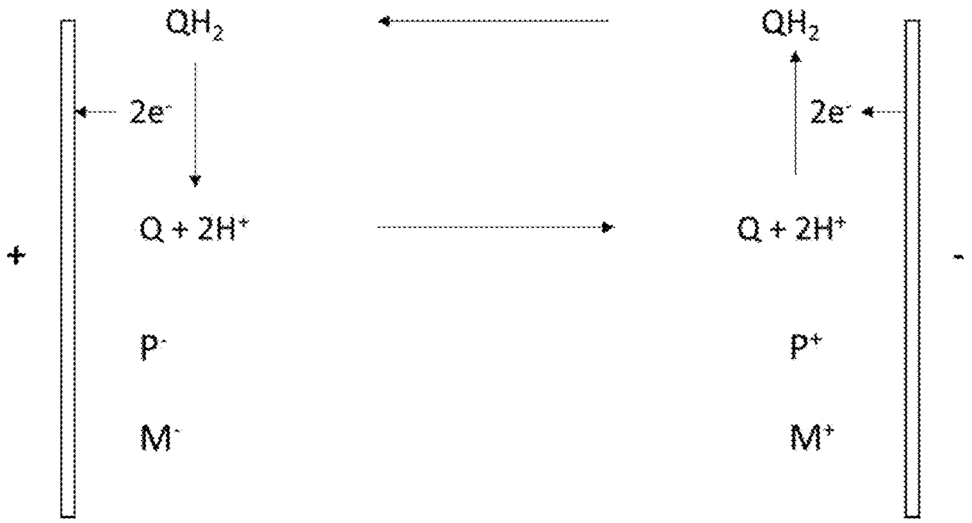
FIG. 5 is a scheme of the redox reactions in which an organic electroactive compound is involved.

A scheme that shows some important elements that are related to the operation of the electro-optic device of the invention, including the redox reactions at the electrodes is presented in FIG. 5. FIG. 5 shows a cross section of a microcell having two electrodes and electrophoretic medium between the electrodes, the electrophoretic medium comprising electrically charged pigment particles and the organic electroactive compound. Typically, the distance between the electrodes are in the range of 5-25 μm. The electrophoretic fluid comprises a non-polar liquid, typically having a low dielectric constant, electrically charged pigment particles (P+ and P−). The symbols P+ and P− indicate that the electrophoretic medium contains positively charged pigment particles. In practice, the electrophoretic medium may contain more than two types of electrically charged pigment particles having charges or various magnitudes. FIG. 5 also shows that the electrophoretic medium contains charged reverse micelle structures M+ and M−. These reverse micelle structures may be formed from surfactant-like molecules, such as CCA, which are added into the electrophoretic medium in order to facilitate and maintain pigment charging. When a voltage is applied across the microcells via the electrodes, the positively charged pigment particles and the positively charged reverse micelle structures migrate to the more negatively charged electrode (hereinafter referred to as the cathode), while the negatively charged pigment particles and the negatively charged reverse micelle structures migrate towards the more positively charged electrode (hereinafter referred to as the anode). This migration of charges can screen the electric field that is experienced by any of the electrically charged pigment particles or the charged reverse micelle structures, which are present in parts of the electrophoretic medium that are not near the electrodes. Thus, a potential gradient may be formed in the electrophoretic medium. That is, the potential may be higher near the surface of the electrodes than in spaces way form the surface of the electrodes, as the electrically charged pigment particles and the charged reverse micelle structures migrate, which may enable electron transfer reactions involving components of the electrophoretic medium.

The organic electroactive compounds of the electrophoretic medium of the present invention are represented in FIG. 5 as Q (oxidized form) and QH2 (reduced form). The oxidized form Q and the reduced form QH2 of the organic electroactive compound form the redox couple of the electrophoretic medium. As shown in FIG. 5, QH2 loses two electrons to form Q and two protons at the anode. At the cathode, Q gains two electrons and with the addition of two protons, the reduced form QH2 is formed. An electric current can be sustained, when the reduced form QH2 that is formed at the cathode diffuses to the anode, and the oxidized form Q that is formed at the anode diffuses to the cathode. These redox reactions at the electrodes prevent the depletion of the redox couple Q/QH2.

An electro-optic device must be able to be driven in both directions. That is, application of voltage of one polarity should cause migration of positively charged pigment particles to the viewing side, and application of voltage of the opposite polarity should cause migration of negatively charged pigment particles to the viewing side. In the present invention, a current can be sustained whichever polarity is used to address the device. That is, the protons formed at the anode will equilibrate with the negatively charged pigment particles and negatively charged reverse micelle structures that are driven to the anode, while protons are consumed at the cathode (or, equivalently, anionic materials that consume protons are formed at the cathode). Thus, the electrochemical reactions at the electrodes may at least partially neutralize the electrically charged pigment particles and the charged reverse micelle structures that have been migrated to the electrodes as the microcell is initially polarized. This charge neutralization may lead to a reduction in the remnant voltage that would otherwise cause electrical kick-back and image drift when the display is grounded after having been driven. Because electrical current may be sustained indefinitely in the electro-optic device of the present invention, there is no reason to expect that remnant voltage will increase substantially after an initial polarization and an establishment of a steady state. Indeed, the present inventors have surprisingly found that, in a model system, a current can pass through a microcell that contains organic electroactive compounds of the invention for 48 hours without a substantial increase in remnant voltage and without degradation of the electrodes.

Figure 6:
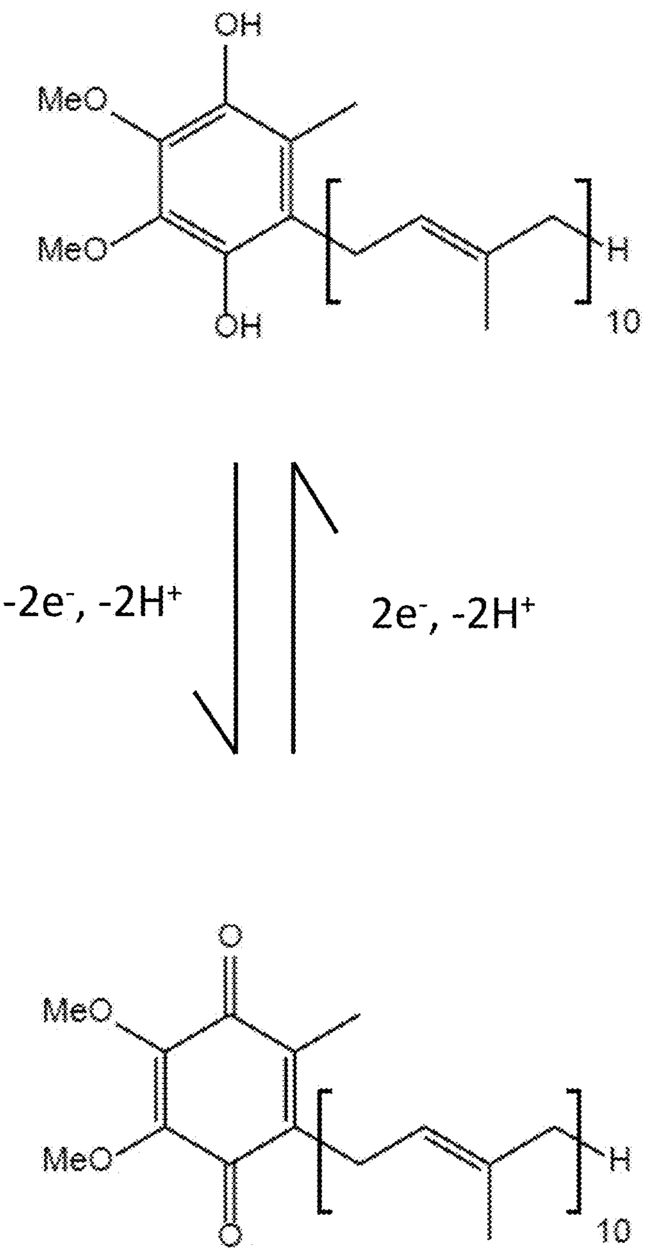
FIG. 6 shows the oxidized and reduced forms of ubiquinol-10 and the redox reactions that are involved in the transformation between the two forms.

Any compound that (a) has oxidized and reduced forms that may be at least partly reversibly formed and (b) is soluble, or can be part of reverse micelle structures, in the non-polar liquid of the electrophoretic medium may be used in the present invention. Preferred compounds include substituted quinone/hydroquinone pairs (or the corresponding catechols) in which side reactions are minimized by suitable substitution on the benzene ring or rings. One particularly preferred pair of compounds are ubiquinol/ubiquinone, having the structure shown in FIG. 6. Ubiquinol, the structure at the top of FIG. 6, is the reduced form and ubiquinone, the structure at the bottom of FIG. 6, is the oxidized form.

Figure 7:
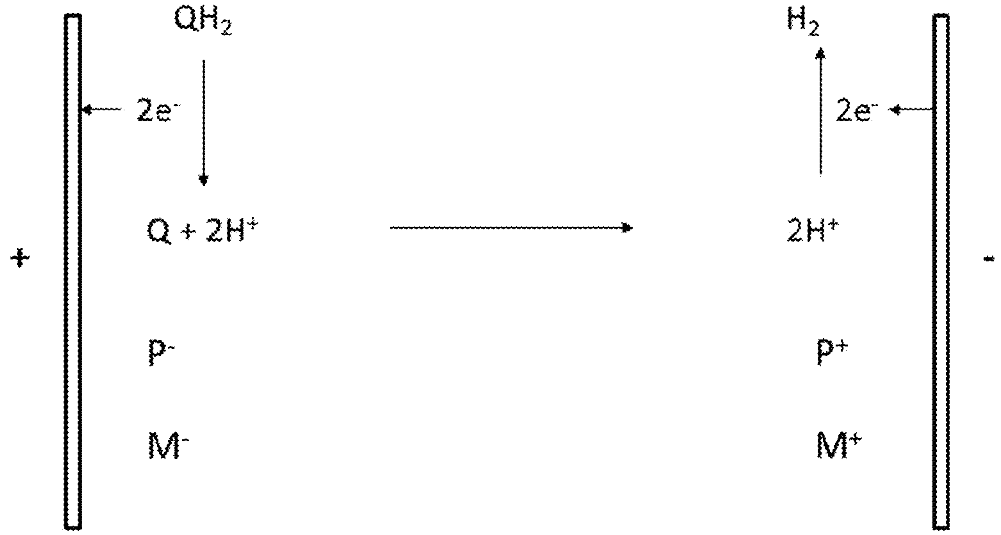
FIG. 7 is a scheme of the redox reactions in the electrophoretic medium at an initial period upon the introduction of the reduced form of an organic electroactive compound.

It is possible that an electrophoretic medium of a device is initially charged with only one of the two forms (oxidized form or reduced form of a redox pair), because the corresponding partner compound will be formed as the device is driven. A reaction scheme of such formation is shown in FIG. 7. At first, as the device is driven, the reduced form of the organic electroactive compound QH2, which was initially included in the electrophoretic medium, is converted to the oxidation for Q at the anode. Thus, even if, initially, there was no Q present at the cathode to sustain a current, another reduction may occur instead, for example, the reduction of a proton from water to form hydrogen ions, as shown in FIG. 7. This reaction may not be reversible. However, as this reaction proceeds in the cathode, more of the oxidized form Q of the organic electroactive compound will be produced and be build up in the microcell until there is sufficient concentration in the electrophoretic medium to sustain a continuous electric current. Thus, the organic electroactive compound may be added into the electrophoretic medium of an electro-optic device in either their reduced or their oxidized form, or a mixture of the two forms. Furthermore, it is possible to add a combination of two (or more) organic electroactive compounds into the electrophoretic medium. For example, the oxidized form of one organic electroactive compound A and the reduced form of another organic electroactive compound B may be used. In this case, it may be desirable that the standard reduction potential of the oxidized form of organic electroactive compound Abe less positive than that of the oxidized form of organic electroactive compound B. This may prevent the reaction between the two organic electroactive compounds.

As mentioned above, the reduced form of the organic electroactive compound, which is used in the present invention, is oxidizable at the anode. However, it is preferable that this organic electroactive compound does not readily react with oxygen.

The molecular structure of the reduced form of the organic electroactive compound may be represented by Formulas I to IX. In these formulas, $R_1$ to $R_{39}$ may be hydrogen, substituted or unsubstituted alkyl, alkenyl, or aryl groups, and substituents $R_1$ and $R_2$, taken together, and/or $R_3$ and $R_4$, and/or $R_5$ and $R_6$, and/or $R_6$ and $R_7$, and/or $R_7$ and $R_8$, $R_9$ and $R_{10}$, and/or $R_{11}$ and $R_{12}$, and/or $R_{14}$ and $R_{15}$, and/or $R_{15}$ and $R_{16}$, and/or $R_{16}$ and $R_{17}$, and/or $R_{19}$ and $R_{20}$, and/or $R_{21}$ and $R_{22}$, and/or $R_{25}$ and $R_{26}$, and/or $R_{26}$ and $R_{27}$, and/or $R_{27}$ and $R_{28}$, may form a ring; and at least one of $R_{31}$ and $R_{32}$ is an aryl group, at least one of $R_{33}$ and $R_{34}$ is an aryl group, and at least one of $R_{36}$ and $R_{37}$ is an aryl group.

At least one of $R_1$ to $R_4$ of Formula I, at least one of $R_5$ to $R_8$ of Formula II, at least one of $R_9$ to $R_{13}$ of Formula III, at least one of $R_{14}$ to $R_{18}$ of formula IV, at least one of $R_{19}$ to $R_{24}$ of Formula V, at least one of $R_{25}$ to $R_{30}$ of Formula VI, at least one of $R_{31}$ and $R_{32}$ of Formula VII, at least one of $R_{33}$ to $R_{35}$ of Formula VIII, and at least one of $R_{36}$ to $R_{39}$ of Formula IX may be an alkyl or alkenyl group having at least 10 carbon atoms.

At least one of $R_9$ to $R_{12}$ of Formula III, at least one of $R_{14}$ to $R_{17}$ of formula IV, at least one of $R_{19}$ to $R_{22}$ of Formula V, at least one of $R_{25}$ to $R_{28}$ of Formula VI, at least one of $R_{33}$ and $R_{34}$ of Formula VIII, and at least one of $R_{36}$ and $R_{37}$ of Formula IX may be an alkyl or alkenyl group having at least 10 carbon atoms. The alkyl or alkenyl group may have from 10 to carbon atoms to 100 carbon atoms. The alkyl or alkenyl group comprises an isoprene dimer or oligomer comprises from 1 to 20 isoprenyl units ($—CH2CH═C(CH_3)CH_2—$). The alkyl or alkenyl group may comprise an isoprene dimer or oligomer comprising from 1 to 13 isoprenyl units ($—CH2CH═C(CH_3)CH_2—$).

The molecular structure of the reduced form of the organic electroactive compound may be represented by Formula X. Groups $R_1$, $R_2$, and $R_3$ may be hydrogen, alkyl, alkenyl, or alkoxy groups, and n may be an integer from 2 to 20. Groups $R_1$ and $R_2$ may be both methoxy groups, and $R_3$ may be methyl group. Groups $R_1$ and $R_2$ may be both methyl groups, and $R_3$ may be hydrogen.

The reduced form of the organic electroactive compound may be ubiquinol-10. The reduced form of the organic electroactive compound may be represented by Formula XI.

The molecular structure of the oxidized form of the organic electroactive compound may be represented by Formula XII. Groups $R_{40}$, $R_{41}$, $R_{42}$, $R_{43}$, and $R_{44}$ may be hydrogen, alkyl, alkenyl, or alkoxy groups, and m may be an integer from 2 to 20.

The molecular structure of the oxidized form of the organic electroactive compound may be represented by Formula XIII or Formula XIV Groups $R_{40}$, $R_{41}$, $R_{42}$, $R_{43}$, and $R_{44}$ may be hydrogen, alkyl, alkenyl, or alkoxy groups, p may be an integer from 2 to 20, and q may be an integer from 2 to 20. Integer q may be selected from the group consisting of 3, 4, 7, and 9. If the organic electroactive compound is represented by Formula XIV, groups $R_{48}$, $R_{49}$, $R_{53}$, $R_{50}$, and $R_{51}$ may be hydrogens, and $R_{52}$ may be methyl.

The oxidized form of the organic electroactive compound may have a reduction potential that is not greater than 1.0 V relative to a standard hydrogen electrode. Preferably, the oxidized form of the organic electroactive compound has a reduction potential that is not greater than 0.2 V relative to a standard hydrogen electrode. There are organic electroactive compounds meeting this reduction potential criterion, the organic electroactive compounds being soluble in the non-polar liquid of the electrophoretic medium, so that they can rapidly diffuse through the electrophoretic medium to participate in electrochemical reactions at the electrodes to reduce remnant voltages observed following extended DC-imbalanced driving.

It is believed, though the invention is in no way limited by this belief that, in the absence of an organic electroactive compound in accordance with the present invention, oxidation of water to form oxygen (a half-cell reaction with a standard reduction potential of more than 1 V) may occur. Because the organic electroactive compound used in the present invention is more easily reduced than water, when such organic electroactive compound is present, less ionic polarization is required to produce a sufficiently steep potential gradient in the electrode double layer for electron transfer to take place, and the remnant voltage experienced by the electro-optic material is consequently lower.

As mentioned above, the use of an organic electroactive compound in accordance with the present invention is intended to control the build-up of charge near the electrodes. Such a buildup of charge is typically a reversible process. The present invention also seeks to control the nature of the Faradaic reactions that occur at the electrode interfaces, so as to enable DC imbalanced driving of a display without incurring irreversible electrode damage. The organic electroactive compound of the present invention introduces a competitive redox pathway to allow Faradaic reactions to occur at the electrode interfaces without degradation of the electrodes. Without the use of the organic electroactive compound in accordance with the invention, unwanted Faradaic reactions may occur, such as electrolysis of water, leading to the formation of byproducts such as hydrogen and oxygen gas. Even worse, the electrode materials themselves may participate in redox reactions. Some materials that are used in transparent electrodes are prone to oxidation. For example, silver metal nanowires or grids may be readily oxidized to silver cations. Other materials that are widely used in transparent electrodes are prone to reduction. For example, conductive polymers, such as PEDOT:PSS, lose their conductivity when reduced. Indium tin oxide (ITO), another common material used in transparent electrodes, may be irreversibly reduced to metallic tin or metallic indium, leading to discoloration (yellowing) of the transparent electrodes and, eventually, to complete failure. The present invention seeks to introduce competitive redox chemistry to allow Faradaic reactions to occur at the electrode interfaces without degradation of the electrodes. In the case of ITO electrodes, it is desirable that the oxidized form of the organic electroactive compound used in the present invention is more easily reduced than ITO. That is, preferential reduction of the organic electroactive compound preserves the ITO electrode from irreversible electrochemical degradation. On the other hand, it is desirable that the oxidized form of the organic electroactive compound is not very easily reduced that it thermally oxidizes a reduced form, unless such an oxidation produces a new reduced form (i.e., the reduced form corresponding to the oxidized form).

The electro-optic device of the present invention may be operated by a method of operating that comprises the steps: (a) providing the electro-optic device; and (b) driving the electro-optic device using a DC-imbalanced waveform. The remnant voltage of the electro-optic device is reduced in comparison to the remnant voltage of a control electro-optic device.

A control electro-optic device is a device that comprises a control electrophoretic medium. A control electrophoretic medium is similar to an inventive electrophoretic medium in composition, but it does not comprise an organic electroactive compound. The inventive electro-optic device comprises a first electrode layer comprising a light-transmissive electrode, a second electrode layer comprising a plurality of pixel electrodes, and a microcell layer, the microcell layer being disposed between the first electrode layer and the second electrode layer. The microcell layer comprises a plurality of microcells, each microcell of the plurality of microcells comprising an electrophoretic medium, the electrophoretic medium being in contact with the light-transmissive electrode of the first electrode layer and at least one of the plurality of pixel electrodes of the second electrode layer. The electrophoretic medium includes (a) electrically charged pigment particles, (b) a non-polar liquid, (c) a charge control agent, and (d) an organic electroactive compound. The organic electroactive compound is present in the electrophoretic medium in an oxidized form and a reduced form. The oxidized form of the organic electroactive compound is electrochemically reducible at the surface of one of the first and second electrode layers. The reduced form of the organic electroactive compound is electrochemically oxidizable at the surface of one of the first and second electrode layers. The oxidized form and the reduced form of the organic electroactive compound are soluble in the non-polar liquid of the electrophoretic medium or are included in reverse micelle structures that are present in the electrophoretic medium.

EXAMPLES

Example 1

A solution was prepared containing (a) 1 weight % of charge control agents by weight of the solution, (b) 1 weight % of ubiquinol by weight of the solution, and (c) Isopar E. The charge control agent was prepared as described in Example 2 of U.S. Patent Application Pub. 2020/0355978. Ubiquinol-10 is supplied by Biosynth, Staad, Switzerland. The solution was introduced into a cell comprising two opposing glass plates, each coated with a transparent conductive coating of indium tin oxide (ITO) spaced apart by a distance of 25 μm, with a surface area of 6.5 $cm^2$. The cell was sealed using an epoxy composition and then driven with 15V DC for 48 hours at 25° C. During the driving period, the electrical current that passed through the cell was continually measured. After this time, the cell was driven at 0V for 50 ms, following which it was allowed to float and the remnant voltage was measured.

Figure 8:
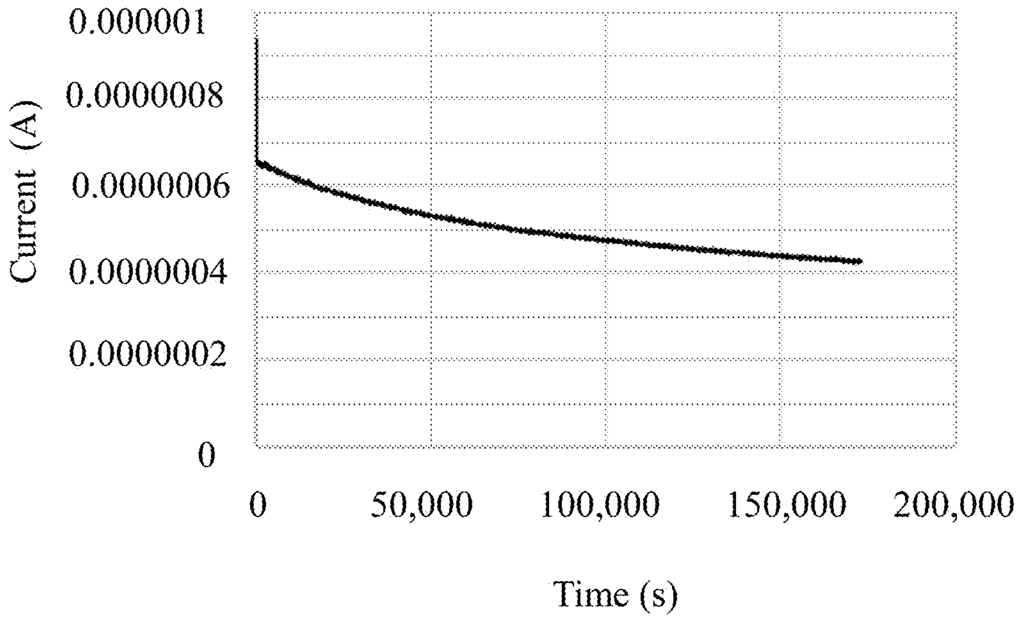
FIG. 8 is a graph of the electric current versus time flowing through an inventive electrophoretic medium (but without including electrically charged pigment particles) over 48 hours under continuous application of a DC voltage across the liquid.
Figure 9:
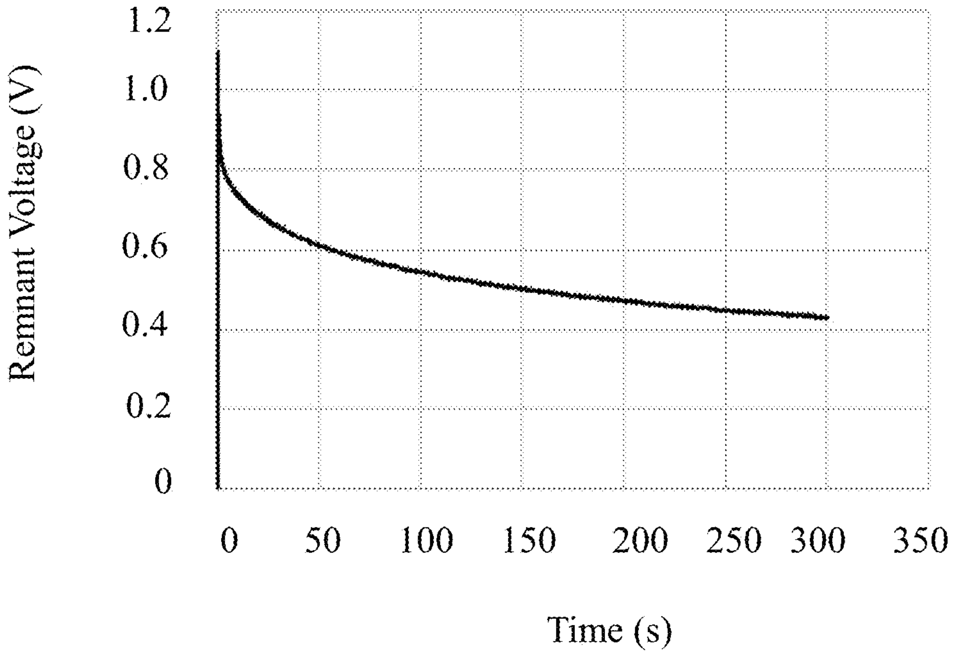
FIG. 9 is a graph of remnant voltage versus time that was measured across an inventive electrophoretic medium, but without including electrically charged pigment particles, after application of a DC voltage across the liquid over 48 hours and removal of the applied voltage.

The electric current flowing during the 48-hour driving period is provided in FIG. 8. The graph of FIG. 8 is the measured electric current versus time. It can be seen from this graph that only a modest decrease in current was observed during the 48-hour driving period. The cell remained transparent throughout the driving period, although ITO degrades, turning yellow, under the same conditions if a control solution is used, wherein control solution comprises only CCA in Isopar E (without the organic electroactive compound). The remnant voltage during 300 s of floating following the brief drive at 0V is shown in FIG. 9, which is a graph of remnant voltage over time. In conclusion, it was shown that continuous direct current can be passed through a model composition, which includes an organic electroactive compound of the present invention) without degrading the electrodes or the model composition itself.

Example 2

An electrophoretic medium was prepared comprising a white pigment similar to pigment W1, a magenta pigment similar to pigment M1, and a cyan pigment similar to C1 in U.S. Pat. No. 10,678,111. The yellow pigment was a surface-treated Pigment Yellow 180, prepared by dispersion polymerization as described in Example 5 of U.S. Patent Application Pub. 2023/0213790. The electrophoretic medium also contained the CCA of Example 1. The total amount of this CCA in the electrophoretic compositions was 1.8 weight % by weight of the electrophoretic medium. The electrophoretic medium also contained 1 weight % of polydimethylsiloxane polymer (PDMS DMS-T72 having molecular weight of approximately 700,000, supplied by Gelest Corporation) by weight of the electrophoretic medium as an image stabilizer. The weight % content of each pigment particle type by weight of the electrophoretic medium is shown in Table 1.

TABLE 1

Content of Pigment Particles in the Electrophoretic Medium.

| Pigment | Wt % |
|---|---|
| White Pigment | 31.5 |
| Cyan Pigment | 3.2 |
| Magenta Pigment | 2.4 |
| Yellow Pigment | 3.2 |

Example 3

Figure 10:
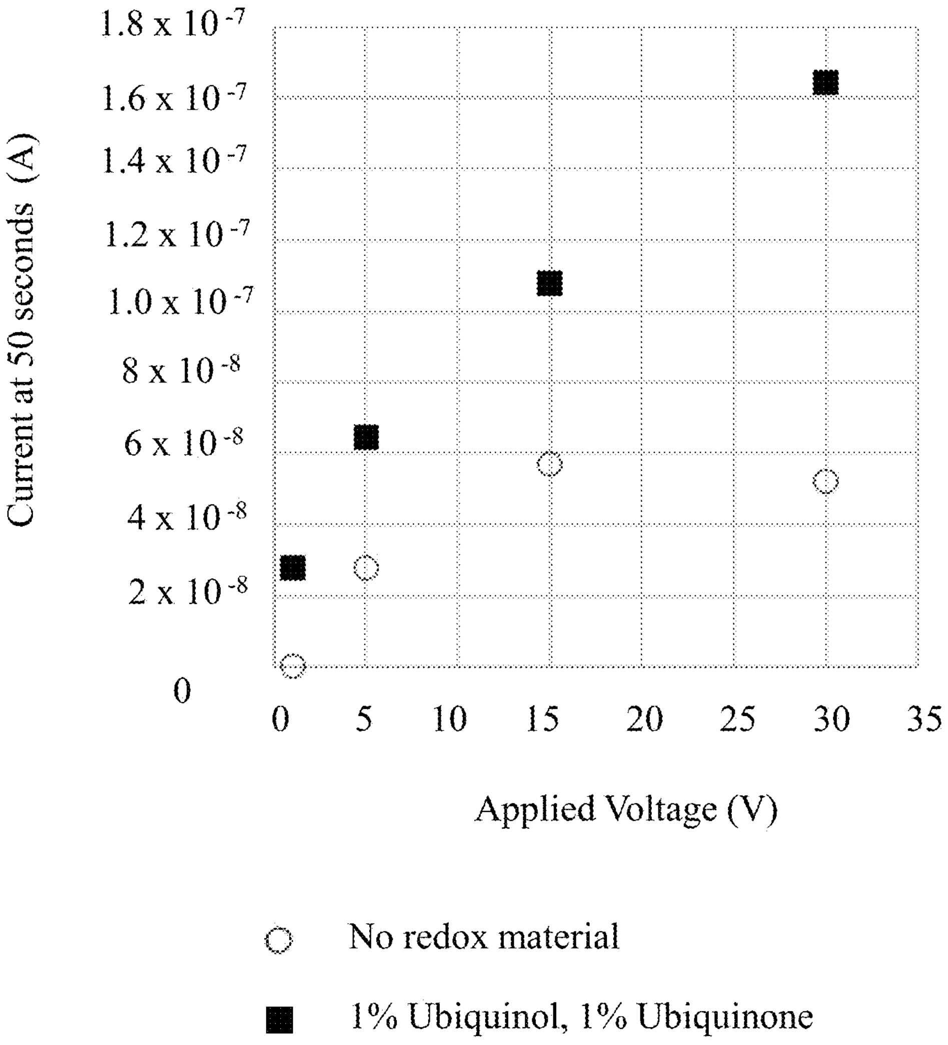
FIG. 10 is a graph of the measured electric current flowing through a control and an inventive electrophoretic medium versus applied voltage after driving the medium using various DC voltages and removal of the voltage.
Figure 11:
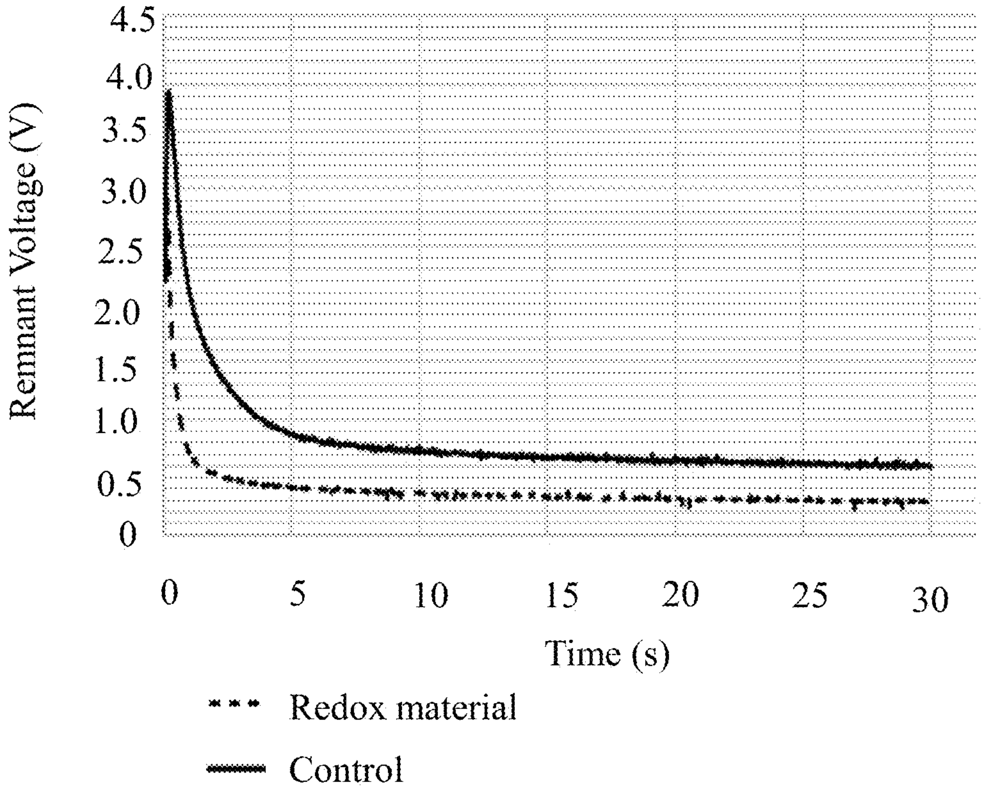
FIG. 11 is a graph of the measured remnant voltage through a control and an inventive electrophoretic medium versus time after driving the medium using various DC voltages and removal of the voltage.

The electrophoretic medium from Example 2 was separated into two portions 2A and 2B. Sample 2A was loaded into a cell similar to that described above in Example 1, except that the distance between the two electrodes was 10 μm and the surface area was 1 $cm^2$. Into Sample 2B ubiquinol and ubiquinone were added (1 weight % of ubiquinol by weight of the electrophoretic medium and 1 weight % of ubiquinol by weight of the electrophoretic medium) to prepare Sample 3B. Ubiquinol and Ubiquinone are available from AmBeed, IL, USA. Sample 3B was loaded into a cell (same type of cell as the one that Sample 2A was loaded). Cells containing Samples 2A and 3B were driven with DC voltages having amplitude of 1, 5, 15 and 30V. Each voltage was applied for 240 seconds, after which they were driven at 0V for 100 ms. Then, the cells were allowed to float while the remnant voltage was measured. FIG. 10 shows the currents measured for Samples 2A and 3B as a function of the applied voltage, while FIG. 11 shows the remnant voltages measured during the final float state. It can be seen that: (i) the current that passed through Sample 3B (containing the organic electroactive compounds) is higher than the current that passed thought Sample 2A (control), and (ii) the remnant voltage measured in Sample 3B (containing the organic electroactive compounds) is lower than that measured in Sample 2A (control). That is, electrophoretic media comprising an organic electroactive compound according to the invention show improved performance (lower remnant voltage).

Figure 12:
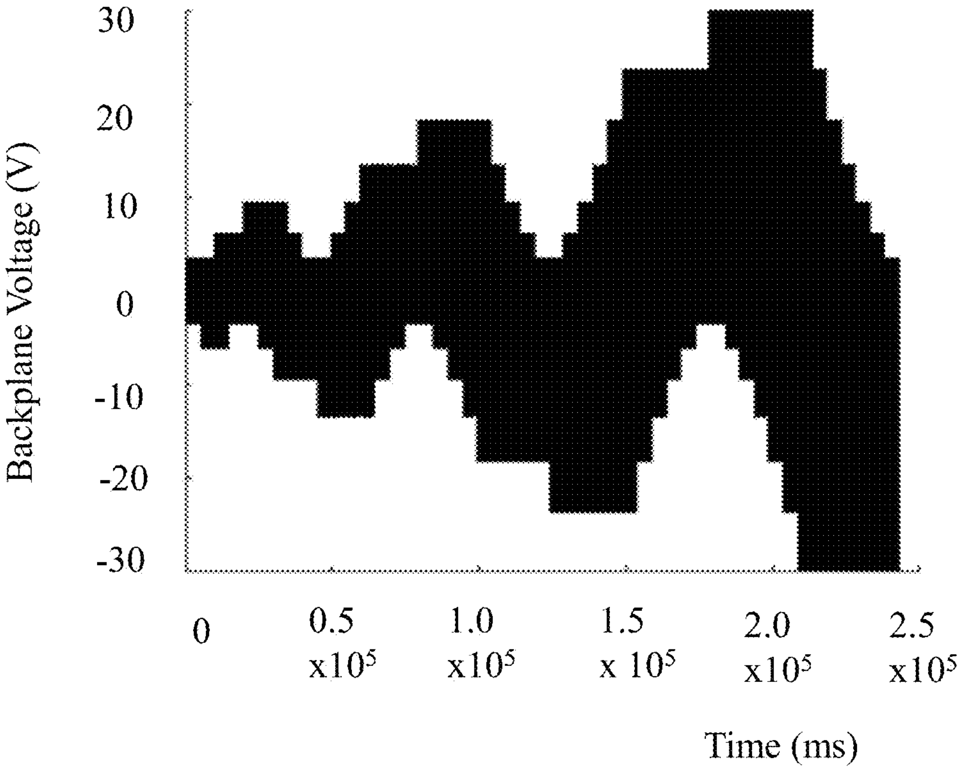
FIG. 12 is a waveform that was applied to electro-optic device media for measuring the color gamut of the corresponding electrophoretic medium.
Figure 13:
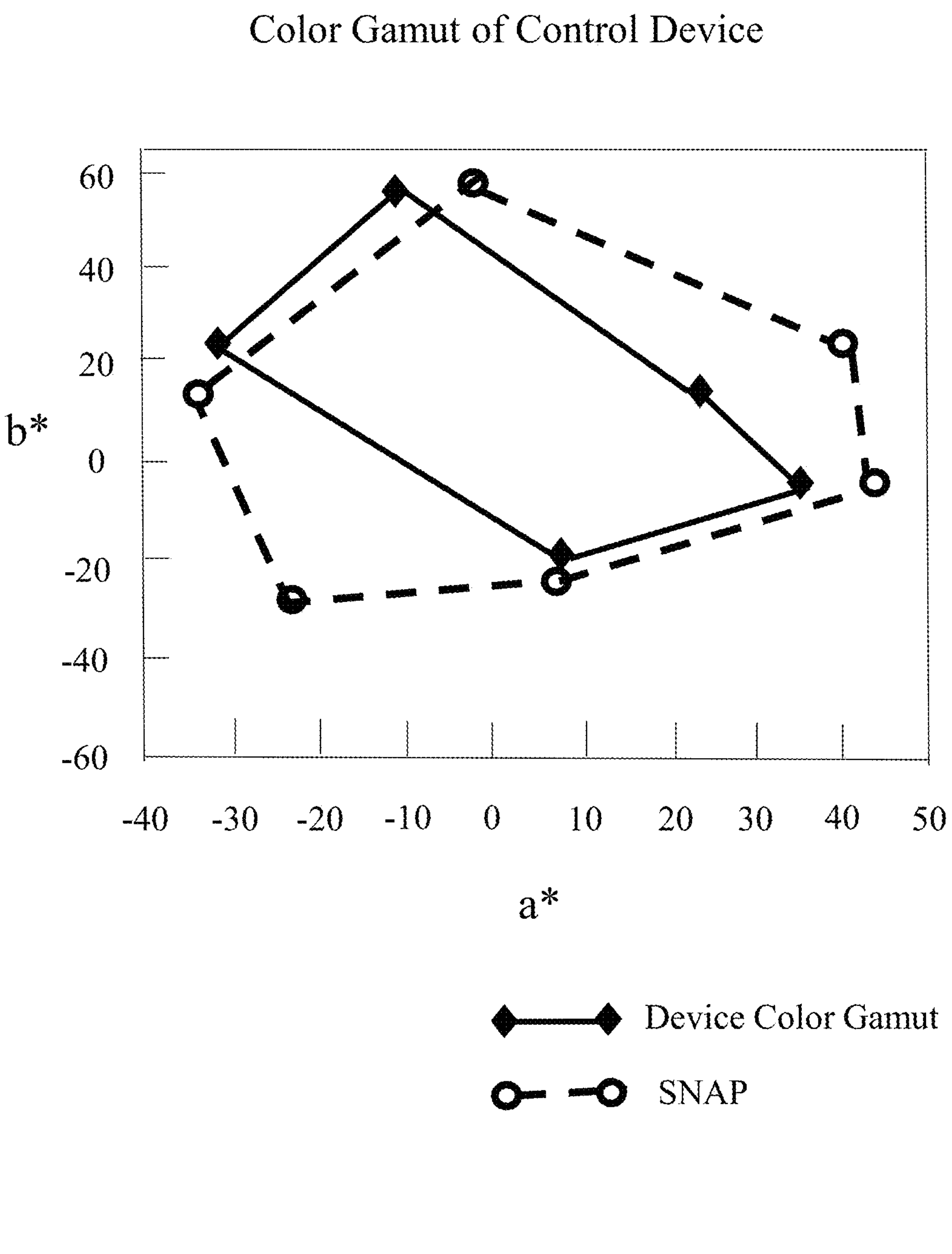
FIG. 13 is the measured color gamut of a control electro-optic device.
Figure 14:
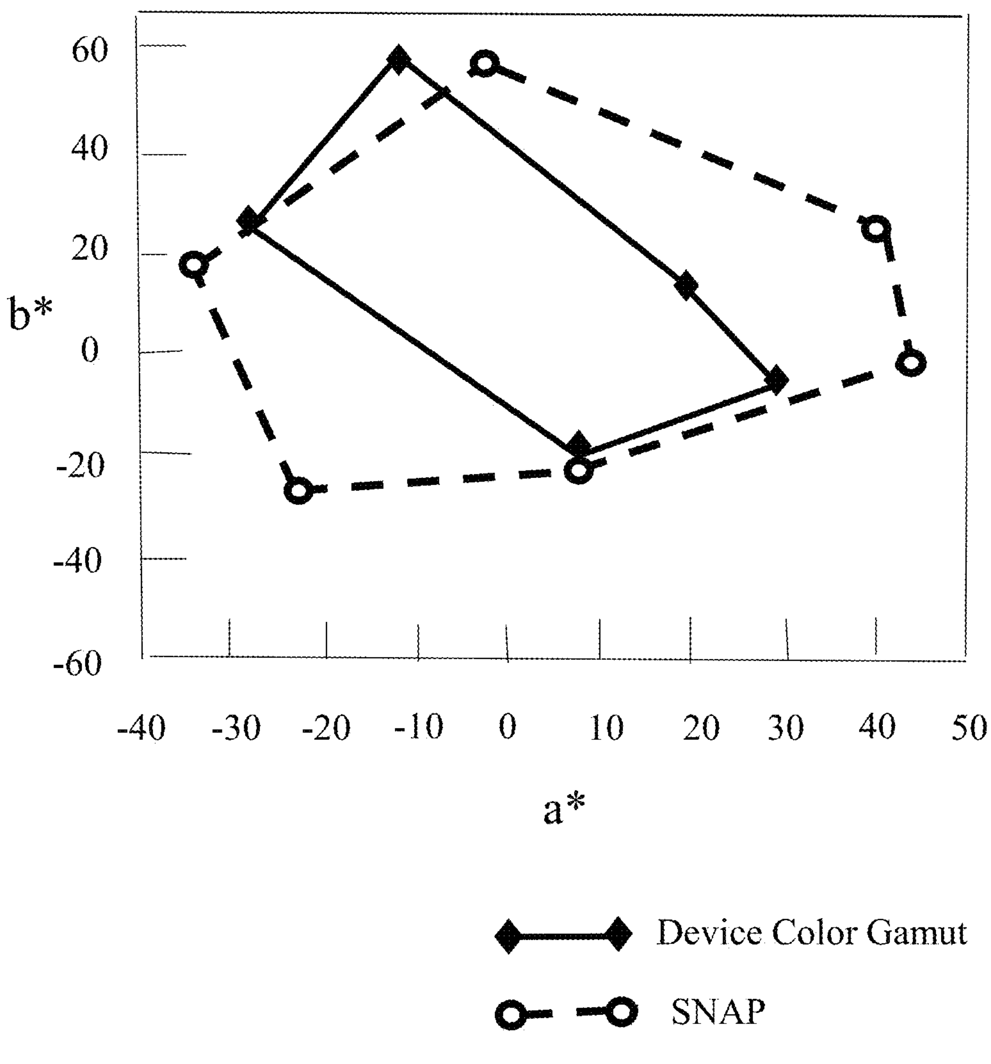
FIG. 14 is the measured color gamut of an inventive electro-optic device.

The color gamut of the electro-optic device prepared from electrophoretic media of Sample 2A (control) and Sample 3B (inventive) were also measured. The waveform of FIG. 12, which is the voltage applied to the back plane relative to the front plane, was used to probe the total color gamut (i.e., the volume of all colors addressable by the device). The waveform of FIG. 12 was used for testing purposes, even if it is not a practical waveform for a commercial display. The waveform is built from "dipoles", i.e., pairs of pulses of opposite polarity, whose duration and magnitude are systematically varied as shown by the dark envelope in FIG. 12. The voltages explored were +/−3.5, 6.1, 9.4, 13.4, 18.2, 23.7, and 30V and the pulse length durations were 50, 80, 120, 190 and 300 milliseconds. For every voltage pair (+,−), every pulse duration pair was visited once. This was done in such a way that the pulse duration pair in one dipole had exactly one value changed in the next dipole, and this value was adjacent in the ordered list of pulse duration values. The voltages were explored in a similar fashion. In this way, the waveform was as smooth in its variations as possible, in that successive dipoles were as similar as possible to each other. The reflection spectra were obtained throughout the waveform (not only at its conclusion) and converted to CIEL*a*b* units. The color gamut observed from the electro-optic device that comprised the control electrophoretic medium is shown in FIG. 13 and the color gamut observed from the electro-optic device that comprised the inventive electrophoretic medium is shown in FIG. 14. It can be seen from FIGS. 13 and 14 that the color gamuts of control and inventive devices are very similar. That is, the organic electroactive compounds of the invention can be added to electrophoretic media without significantly affecting their electro-optical performance, but allowing for DC driving with reduced buildup of remnant voltage.

Clauses

Clause 1: An electro-optic device comprising: a first electrode layer comprising a light-transmissive electrode; a second electrode layer comprising a plurality of pixel electrodes; a microcell layer disposed between the first electrode layer and the second electrode layer, the microcell layer comprising a plurality of microcells, each microcell of the plurality of microcells comprising an electrophoretic medium, the electrophoretic medium being in contact with the light-transmissive electrode of the first electrode layer and at least one of the plurality of pixel electrodes of the second electrode layer, the electrophoretic medium including: (a) electrically charged pigment particles, (b) a non-polar liquid; (c) a charge control agent; and (d) an organic electroactive compound, wherein

- the organic electroactive compound is present in the electrophoretic medium in an oxidized form and a reduced form,
- the oxidized form of the organic electroactive compound is electrochemically reducible at the surface of one of the first and second electrode layers,
- the reduced form of the organic electroactive compound is electrochemically oxidizable at the surface of one of the first and second electrode layers, and
- the oxidized form and the reduced form of the organic electroactive compound (i) are soluble in the non-polar liquid of the electrophoretic medium, or (ii) are part of reverse micelle structures that are present in the non-polar liquid of the electrophoretic medium.

Clause 2: The electro-optic device of clause 1, wherein the molecular structure of the reduced form of the organic electroactive compound is represented by Formulas I to IX, wherein $R_1$ to $R_{39}$ may be hydrogen, substituted or unsubstituted alkyl, alkenyl, or aryl groups, and substituents $R_1$ and $R_2$, taken together, and/or $R_3$ and $R_4$, and/or $R_5$ and $R_6$, and/or $R_6$ and $R_7$, and/or $R_7$ and $R_8$, $R_9$ and $R_{10}$, and/or $R_{11}$ and $R_{12}$, and/or $R_{14}$ and $R_{15}$, and/or $R_{15}$ and $R_{16}$, and/or $R_{16}$ and $R_{17}$, and/or $R_{19}$ and $R_{20}$, and/or $R_{21}$ and $R_{22}$, and/or $R_{25}$ and $R_{26}$, and/or $R_{26}$ and $R_{27}$, and/or $R_{27}$ and $R_{28}$, may form a ring; and at least one of $R_{31}$ and $R_{32}$ is an aryl group, at least one of $R_{33}$ and $R_{34}$ is an aryl group, and at least one of $R_{36}$ and $R_{37}$ is an aryl group.

Clause 3: The electro-optic device of clause 2, wherein at least one of $R_1$ to $R_4$ of Formula I, at least one of $R_5$ to $R_8$ of Formula II, at least one of $R_9$ to $R_{13}$ of Formula III, at least one of $R_{14}$ to $R_{18}$ of formula IV, at least one of $R_{19}$ to $R_{24}$ of Formula V, at least one of $R_{25}$ to $R_{30}$ of Formula VI, at least one of $R_{31}$ and $R_{32}$ of Formula VII, at least one of $R_{33}$ to $R_{35}$ of Formula VIII, and at least one of $R_{36}$ to $R_{39}$ of Formula IX is an alkyl or alkenyl group having at least 10 carbon atoms.

Clause 4: The electro-optic device of clause 2, wherein at least one of $R_9$ to $R_{12}$ of Formula III, at least one of $R_{14}$ to $R_{17}$ of formula IV, at least one of $R_{19}$ to $R_{22}$ of Formula V, at least one of $R_{25}$ to $R_{28}$ of Formula VI, at least one of $R_{33}$ and $R_{34}$ of Formula VIII, and at least one of $R_{36}$ and $R_{37}$ of Formula IX is an alkyl or alkenyl group having at least 10 carbon atoms.

Clause 5: The electro-optic device according to clause 3 or clause 4, wherein the alkyl or alkenyl group has from 10 to carbon atoms to 100 carbon atoms.

Clause 6: The electro-optic device according to any one of clause 2 to clause 5, wherein the alkyl or alkenyl group comprises an isoprene dimer or oligomer comprises from 1 to 20 isoprenyl units ($—CH_2CH{=}C(CH_3)CH_2—$).

Clause 7: The electro-optic device according to any one of clause 2 to clause 5, wherein the alkyl or alkenyl group comprises an isoprene dimer or oligomer comprising from 1 to 13 isoprenyl units ($—CH_2CH{=}C(CH_3)CH_2—$).

Clause 8: The electro-optic device according to any one of clause 2 to clause 7, wherein the molecular structure of the reduced form of the organic electroactive compound is represented by Formula X, wherein $R_1$, $R_2$, and $R_3$ may be hydrogen, alkyl, alkenyl, or alkoxy groups, and n is an integer from 2 to 20.

Clause 9: The electro-optic device of clause 8, wherein $R_1$ and $R_2$ are methoxy groups, and $R_3$ is methyl group.

Clause 10: The electro-optic device of clause 9, wherein the reduced form of the organic electroactive compound is ubiquinol-10.

Clause 11: The electro-optic device of clause 8, wherein $R_1$ and $R_2$ are methyl groups, and $R_3$ is hydrogen.

Clause 12: The electro-optic device of clause 11, wherein the reduced form of the organic electroactive compound is represented by Formula XI.

Clause 13: The electro-optic device according to clause 1, wherein the molecular structure of the oxidized form of the organic electroactive compound is represented by Formula XII, wherein $R_{40}$, $R_{41}$, $R_{42}$, $R_{43}$, and $R_{44}$ may be hydrogen, alkyl, alkenyl, or alkoxy groups, and m is an integer from 2 to 20.

Clause 14: The electro-optic device of clause 1, wherein the molecular structure of the oxidized form of the organic electroactive compound is represented by Formula XIII or Formula XIV, wherein $R_{45}$, $R_{46}$, $R_{47}$, $R_{48}$, $R_{49}$, $R_{50}$, $R_{51}$, and $R_{52}$ may be hydrogen, alkyl, alkenyl, or alkoxy groups, p is an integer from 2 to 20, and q is an integer from 2 to 20.

Clause 15: The electro-optic device of clause 14, wherein the molecular structure of the oxidized form of the organic electroactive compound is represented by Formula XIV, $R_{48}$, $R_{49}$, $R_{50}$, $R_{51}$ are hydrogens, and $R_{52}$ is methyl.

Clause 16: The electro-optic device of clause 15, wherein q is selected from the group consisting of 3, 4, 7, and 9.

Clause 17: The electro-optic device according to any one of clause 1 to clause 16, wherein the oxidized form of the organic electroactive compound has a reduction potential that is not greater than 1.0 V relative to a standard hydrogen electrode.

Clause 18: A method of operating an electro-optic device, the method of operating comprising: (a) providing the electro-optic device according to clause 1; and (b) driving the electro-optic device using a DC-imbalanced waveform.

Clause 19: The method of operating the electro-optic device of clause 18, wherein the remnant voltage of the electro-optic device is lower than the remnant voltage of a control electro-optic device, the control electro-optic device including a control electrophoretic medium comprising no organic electroactive compound.

Clause 20: An electro-optic device comprising: a first electrode layer comprising a light-transmissive electrode; a second electrode layer comprising a plurality of pixel electrodes; a microcell layer disposed between the first electrode layer and the second electrode layer, the microcell layer comprising a plurality of microcells, each microcell of the plurality of microcells comprising an electrophoretic medium, the electrophoretic medium being in contact with the light-transmissive electrode of the first electrode layer and at least one of the plurality of pixel electrodes of the second electrode layer, the electrophoretic medium including: (a) electrically charged pigment particles, (b) a non-polar liquid; (c) a charge control agent; and (d) an organic electroactive compound, wherein the organic electroactive compound is present in the electrophoretic medium at least in one of an oxidized form or a reduced form, the oxidized form of the organic electroactive compound is electrochemically reducible at the surface of one of the first and second electrode layers, the reduced form of the organic electroactive compound is electrochemically oxidizable at the surface of one of the first and second electrode layers, and the oxidized form and the reduced form of the organic electroactive compound (i) are soluble in the non-polar liquid of the electrophoretic medium, or (ii) are part of reverse micelle structures that are present in the non-polar liquid of the electrophoretic medium.

The invention claimed is:

1. An electro-optic device comprising:

a first electrode layer comprising a light-transmissive electrode;

a second electrode layer comprising a plurality of pixel electrodes;

a microcell layer disposed between the first electrode layer and the second electrode layer, the microcell layer comprising a plurality of microcells, each microcell of the plurality of microcells comprising an electrophoretic medium, the electrophoretic medium being in contact with the light-transmissive electrode of the first electrode layer and at least one of the plurality of pixel electrodes of the second electrode layer, the electrophoretic medium including:

(a) electrically charged pigment particles, (b) a non-polar liquid;

(c) a charge control agent; and (d) an organic electroactive compound, wherein the organic electroactive compound is present in the electrophoretic medium in an oxidized form and a reduced form, the oxidized form of the organic electroactive compound is electrochemically reducible at the surface of one of the first and second electrode layers, the reduced form of the organic electroactive compound is electrochemically oxidizable at the surface of one of the first and second electrode layers, and the oxidized form and the reduced form of the organic electroactive compound (i) are soluble in the non-polar liquid of the electrophoretic medium, or (ii) are part of reverse micelle structures that are present in the non-polar liquid of the electrophoretic medium.

2. The electro-optic device of claim 1, wherein the molecular structure of the reduced form of the organic electroactive compound is represented by Formulas I to IX, Formula I

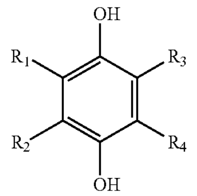

Formula II

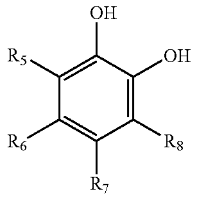

Formula III

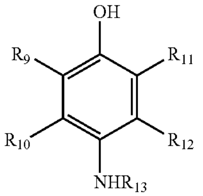

Formula IV

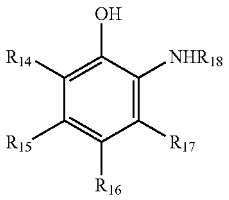

Formula V

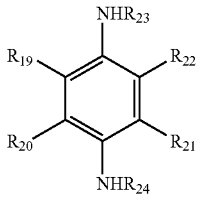

Formula VI

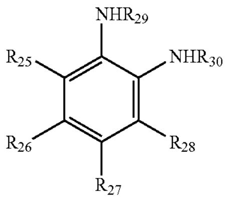

Formula VII

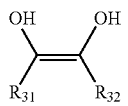

Formula VIII

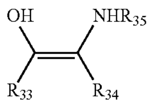

Formula IX

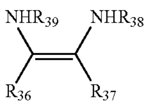

wherein $R_1$ to $R_{39}$ may be hydrogen, substituted or unsubstituted alkyl, alkenyl, or aryl groups, and substituents $R_1$ and $R_2$ (taken together), and/or $R_3$ and $R_4$, and/or $R_5$ and $R_6$, and/or $R_6$ and $R_7$, and/or $R_7$ and $R_8$, $R_9$ and $R_{10}$, and/or $R_{11}$ and $R_{12}$, and/or $R_{14}$ and $R_{15}$, and/or $R_{15}$ and $R_{16}$, and/or $R_{16}$ and $R_{17}$, and/or $R_{19}$ and $R_{20}$, and/or $R_{21}$ and $R_{22}$, and/or $R_{25}$ and $R_{26}$, and/or $R_{26}$ and $R_{27}$, and/or $R_{27}$ and $R_{28}$, may form a ring; and at least one of $R_{31}$ and $R_{32}$ is an aryl group, at least one of $R_{33}$ and $R_{34}$ is an aryl group, and at least one of $R_{36}$ and $R_{37}$ is an aryl group.

3. The electro-optic device of claim 2, wherein at least one of $R_9$ to $R_{12}$ of Formula III, at least one of $R_{14}$ to $R_{17}$ of formula IV, at least one of $R_{19}$ to $R_{22}$ of Formula V, at least one of $R_{25}$ to $R_{28}$ of Formula VI, at least one of $R_{33}$ and $R_{34}$ of Formula VIII, and at least one of $R_{36}$ and $R_{37}$ of Formula IX is an alkyl or alkenyl group having at least 10 carbon atoms.

4. The electro-optic device of claim 2, wherein at least one of $R_1$ to $R_4$ of Formula I, at least one of $R_5$ to $R_8$ of Formula II, at least one of $R_9$ to $R_{13}$ of Formula III, at least one of $R_{14}$ to $R_{18}$ of formula IV, at least one of $R_{19}$ to $R_{24}$ of Formula V, at least one of $R_{25}$ to $R_{30}$ of Formula VI, at least one of $R_{31}$ and $R_{32}$ of Formula VII, at least one of $R_{33}$ to $R_{35}$ of Formula VIII, and at least one of $R_{36}$ to $R_{39}$ of Formula IX is an alkyl or alkenyl group having at least 10 carbon atoms.

5. The electro-optic device of claim 4, wherein the alkyl or alkenyl group has from 10 to carbon atoms to 100 carbon atoms.

6. The electro-optic device of claim 5, wherein the alkyl or alkenyl group comprises an isoprene dimer or oligomer comprising from 1 to 13 isoprenyl units ($—CH_2CH=C(CH_3)CH_2—$).

7. The electro-optic device of claim 5, wherein the alkyl or alkenyl group comprises an isoprene dimer or oligomer comprises from 1 to 20 isoprenyl units ($—CH_2CH=C(CH_3)CH_2—$).

8. The electro-optic device of claim 7, wherein the molecular structure of the reduced form of the organic electroactive compound is represented by Formula X, Formula X

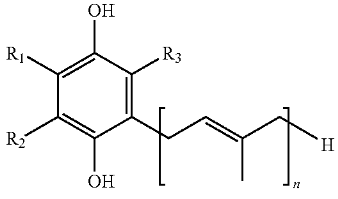

wherein $R_1$, $R_2$, and $R_3$ may be hydrogen, alkyl, alkenyl, or alkoxy groups, and n is an integer from 2 to 20.

9. The electro-optic device of claim 8, wherein $R_1$ and $R_2$ are methoxy groups, and $R_3$ is methyl group.

10. The electro-optic device of claim 9, wherein the reduced form of the organic electroactive compound is ubiquinol-10.

11. The electro-optic device of claim 8, wherein $R_1$ and $R_2$ are methyl groups, and $R_3$is hydrogen.

12. The electro-optic device of claim 11, wherein the reduced form of the organic electroactive compound is represented by Formula XI.

Formula XI

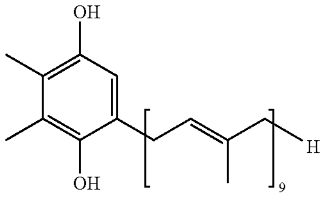

13. The electro-optic device of claim 1, wherein the molecular structure of the oxidized form of the organic electroactive compound is represented by Formula XII, Formula XII

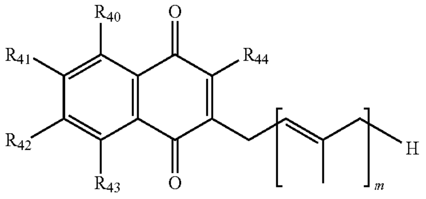

wherein $R_{40}$, $R_{41}$, $R_{42}$, $R_{43}$, and $R_{44}$ may be hydrogen, alkyl, alkenyl, or alkoxy groups, and m is an integer from 2 to 20.

14. The electro-optic device of claim 1, wherein the molecular structure of the oxidized form of the organic electroactive compound is represented by Formula XIII or Formula XIV, Formula XIII

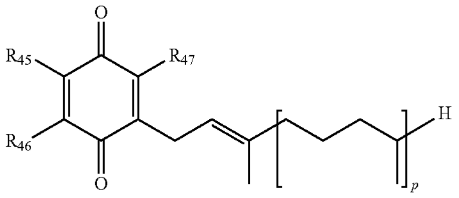

Formula XIV

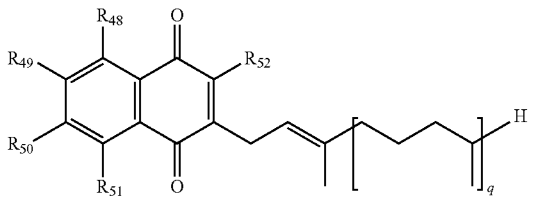

wherein $R_{45}$, $R_{46}$, $R_{47}$, $R_{48}$, $R_{49}$, $R_{50}$, $R_{51}$, and $R_{52}$ may be hydrogen, alkyl, alkenyl, or alkoxy groups, p is an integer from 2 to 20, and q is an integer from 2 to 20.

15. The electro-optic device of claim 14, wherein the molecular structure of the oxidized form of the organic electroactive compound is represented by Formula XIV, $R_{48}$, $R_{49}$, $R_{50}$, $R_{51}$ are hydrogens, and $R_{52}$ is methyl.

16. The electro-optic device of claim 15, wherein q is selected from the group consisting of 3, 4, 7, and 9.

17. The electro-optic device of claim 1, wherein the oxidized form of the organic electroactive compound has a reduction potential that is not greater than 1.0 V relative to a standard hydrogen electrode.

18. A method of operating an electro-optic device, the method of operating comprising:

providing the electro-optic device according to claim 1;

driving the electro-optic device using a DC-imbalanced waveform.

19. An electro-optic device comprising:

a first electrode layer comprising a light-transmissive electrode;

a second electrode layer comprising a plurality of pixel electrodes;

a microcell layer disposed between the first electrode layer and the second electrode layer, the microcell layer comprising a plurality of microcells, each microcell of the plurality of microcells comprising an electrophoretic medium, the electrophoretic medium being in contact with the light-transmissive electrode of the first electrode layer and at least one of the plurality of pixel electrodes of the second electrode layer, the electrophoretic medium including:

(a) electrically charged pigment particles, (b) a non-polar liquid;

(c) a charge control agent; and an organic electroactive compound, wherein the organic electroactive compound is present in the electrophoretic medium at least in one of an oxidized form or a reduced form, the oxidized form of the organic electroactive compound is electrochemically reducible at the surface of one of the first and second electrode layers, the reduced form of the organic electroactive compound is electrochemically oxidizable at the surface of one of the first and second electrode layers, and the oxidized form and the reduced form of the organic electroactive compound (i) are soluble in the non-polar liquid of the electrophoretic medium, or (ii) are part of reverse micelle structures that are present in the non-polar liquid of the electrophoretic medium.

* * * * *